US012697257B2

(12) United States Patent
Mahler et al.

(10) Patent No.: US 12,697,257 B2
(45) Date of Patent: Aug. 4, 2026

(54) AEROMEDICAL AMBULANCE EQUIPMENT AND METHODS

(71) Applicant: Spectrum Aeromed, LLC, Fargo, ND (US)

(72) Inventors: Justin R. Mahler, Fargo, ND (US); Robert D. Smith, Jr., Moorhead, MN (US); Michael E. Gallagher, Fargo, ND (US); Craig M. Mueller, Bloomington, MN (US); Matthew T. Huntting, Burnsville, MN (US)

(73) Assignee: Spectrum Aeromed, LLC, Fargo, ND (US)

( * ) Notice: Subject to any disclaimer, the term of this patent is extended or adjusted under 35 U.S.C. 154(b) by 819 days.

(21) Appl. No.: 17/954,828

(22) Filed: Sep. 28, 2022

(65) Prior Publication Data

US 2023/0270606 A1 Aug. 31, 2023

Related U.S. Application Data

(60) Provisional application No. 63/249,935, filed on Sep. 29, 2021.

(51) Int. Cl.
| | |
|---|---|
| *A61G 3/00* | (2006.01) |
| *A61G 3/02* | (2006.01) |
| *B64D 11/06* | (2006.01) |
| *B64D 11/00* | (2006.01) |

(52) U.S. Cl.
CPC ............. *A61G 3/00* (2013.01); *A61G 3/0254* (2013.01); *B64D 11/0696* (2013.01); *A61G 2220/10* (2013.01); *B64D 2011/0046* (2013.01); *B64D 2011/0069* (2013.01); *B64D 2011/0092* (2013.01)

(58) Field of Classification Search
CPC .... A61G 3/00; A61G 3/0254; A61G 2220/10; A61G 3/0816; B64D 2011/0046; B64D 2011/0092
See application file for complete search history.

(56) References Cited

U.S. PATENT DOCUMENTS

| | | | |
|---|---|---|---|
| 4,115,884 A | 9/1978 | Keogh | |
| 4,352,991 A | 10/1982 | Kaufman | |
| 4,483,499 A | 11/1984 | Fronk | |
| 4,783,025 A | 11/1988 | Moffett | |
| 5,205,601 A * | 4/1993 | Ferris | A61G 1/06 410/7 |
| 5,494,386 A * | 2/1996 | Paull | A61G 1/06 410/3 |
| 5,535,964 A | 7/1996 | Ahlsten | |
| 5,813,629 A | 9/1998 | Cabrera | |
| 5,913,559 A | 6/1999 | Sexton et al. | |
| 6,796,757 B1 * | 9/2004 | Way | A61G 3/0816 410/7 |

(Continued)

*Primary Examiner* — Fredrick C Conley
(74) *Attorney, Agent, or Firm* — Fredrikson & Byron, P.A.

(57) ABSTRACT

The invention provides aeromedical ambulance equipment. In some embodiments, the equipment includes a module base comprising a mount assembly having an unlocked configuration and a locked configuration. The mount assembly preferably can be adjusted between the unlocked and locked configurations by a tool-free operation. In addition, certain embodiments provide a module base having an advantageous system for releasably locking a stretcher onto the module base.

36 Claims, 27 Drawing Sheets

(56) References Cited

U.S. PATENT DOCUMENTS

| | | | |
|---|---|---|---|
| 6,923,606 B2 | 8/2005 | Fehrle et al. | |
| 7,021,596 B2 | 4/2006 | Lory | |
| 8,302,231 B2 | 11/2012 | Moffitt et al. | |
| 8,308,212 B2 * | 11/2012 | Schrand | A61G 1/0565 |
| | | | 410/80 |
| 8,336,939 B2 | 12/2012 | Green et al. | |
| 9,468,784 B2 | 10/2016 | Löser et al. | |
| 9,956,126 B2 | 5/2018 | Russell | |
| 10,610,427 B2 | 4/2020 | MacDonald et al. | |
| 11,090,207 B2 * | 8/2021 | Naber | A61G 3/0254 |
| 12,115,109 B2 * | 10/2024 | Girardin | A61G 3/0833 |
| 2003/0143052 A1 | 7/2003 | Fehrle et al. | |
| 2020/0038268 A1 | 2/2020 | Shrapnel | |

* cited by examiner

FLR

*FIG. 27*

AEROMEDICAL AMBULANCE EQUIPMENT AND METHODS

RELATED APPLICATION

This application claims priority to provisional U.S. Patent Application No. 63/249,935, filed Sep. 29, 2021, the contents of which are incorporated by reference herein.

FIELD OF THE INVENTION

The present invention relates to aeromedical ambulances. More particularly, the present invention relates to equipment for aeromedical ambulances.

BACKGROUND OF THE INVENTION

Various types of aeromedical ambulance equipment are known. Air ambulance modules are used in rotor-wing aircraft, as well as in fixed-wing aircraft. These modules often include a module base and a stretcher. Such modules are sold, for example, by Spectrum Aeromed of Fargo, North Dakota, U.S.A.

It would be desirable to provide an aeromedical ambulance module configured to be removably mounted within an aircraft. It would be particularly desirable for the module to be configured for quick installation and removal, so as to enable rapid conversion of the aircraft between executive and EMS configurations. For example, it would be desirable to provide a module that can be releasably locked and unlocked to/from a floor of an aircraft through tool-free operation. Additionally or alternatively, it would be desirable to provide a module base that has an easy-to-use, durable system for releasably retaining a stretcher thereon.

BRIEF DESCRIPTION OF THE DRAWINGS

FIG. 2 is a top view of two spaced-apart rails of an exemplary aircraft seat track to which a module base in accordance with certain embodiments of the invention can be releasably mounted.

FIG. 15A shows the actuator-lock assembly in an unlocked configuration; FIG. 15B shows the actuator-lock assembly in transition between the unlocked configuration and a locked configuration; and FIG. 15C shows the actuator-lock assembly in the locked configuration.

FIG. 23A shows the actuator-lock assembly in an unlocked configuration; FIG. 23B shows the actuator-lock assembly in transition between the unlocked configuration and a locked configuration; and FIG. 23C shows the actuator-lock assembly in the locked configuration.

FIG. 27 is still another perspective view of the leg construction of FIG. 25.

SUMMARY OF THE INVENTION

Figure 1:
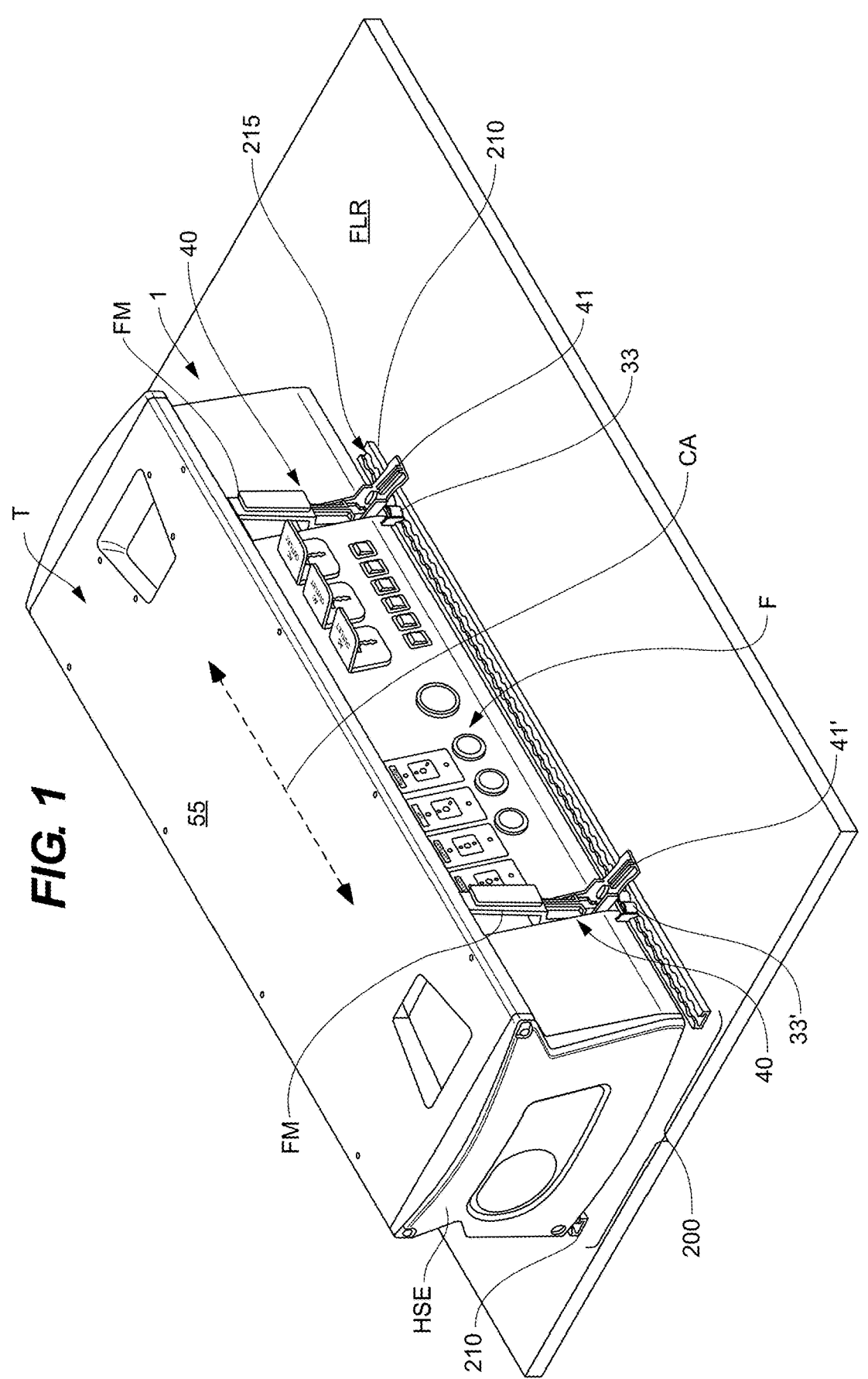
FIG. 1 is a perspective front view of an aeromedical ambulance module base in accordance with certain embodiments of the present invention.

Some embodiments of the invention provide an aeromedical ambulance module configured to be mounted removably to two spaced-apart rails of an aircraft seat track. The ambulance module includes a mount assembly having an unlocked configuration and a locked configuration. In the present embodiments, the mount assembly includes a first lock foot and a first base foot. The first lock foot is an adjustable foot that is moveable relative to the first base foot between an engagement position and a release position, such that when the mount assembly is in the unlocked configuration the first lock foot is in the release position and when the mount assembly is in the locked configuration the first lock foot is in the engagement position.

In certain embodiments, the invention provides an aeromedical ambulance module configured to be mounted in an aircraft. The aeromedical ambulance module comprises a module base, which preferably includes two latches configured to releasably secure a stretcher onto the module base. In embodiments of this nature, each of the two latches preferably has a retracted position and an extended position. In addition, the module base preferably includes an actuator operably coupled with the two latches. Preferably, the actuator is movable between an unlocked position and a locked position, such that each of the two latches is configured to move from the retracted position to the extended position in response to movement of the actuator from the unlocked position to the locked position.

DETAILED DESCRIPTION OF PREFERRED EMBODIMENTS

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

The invention provides aeromedical ambulance (or "air ambulance") equipment. In various embodiments, the invention provides an aeromedical ambulance module 100 comprising a module base 1, a stretcher 10, or both. The aeromedical ambulance equipment can be used in various well-known rotor-wing aircraft and fixed-wing aircraft. The equipment can be used in many different aircraft, including the following non-limiting examples: Pilatus PC-12, Cessna 208, Bombardier Learjet 45/75 fixed-wing aircraft, Cessna Citation jet series fixed-wing aircraft, and King Air fixed-wing aircraft, to name just a few.

Figure 2:
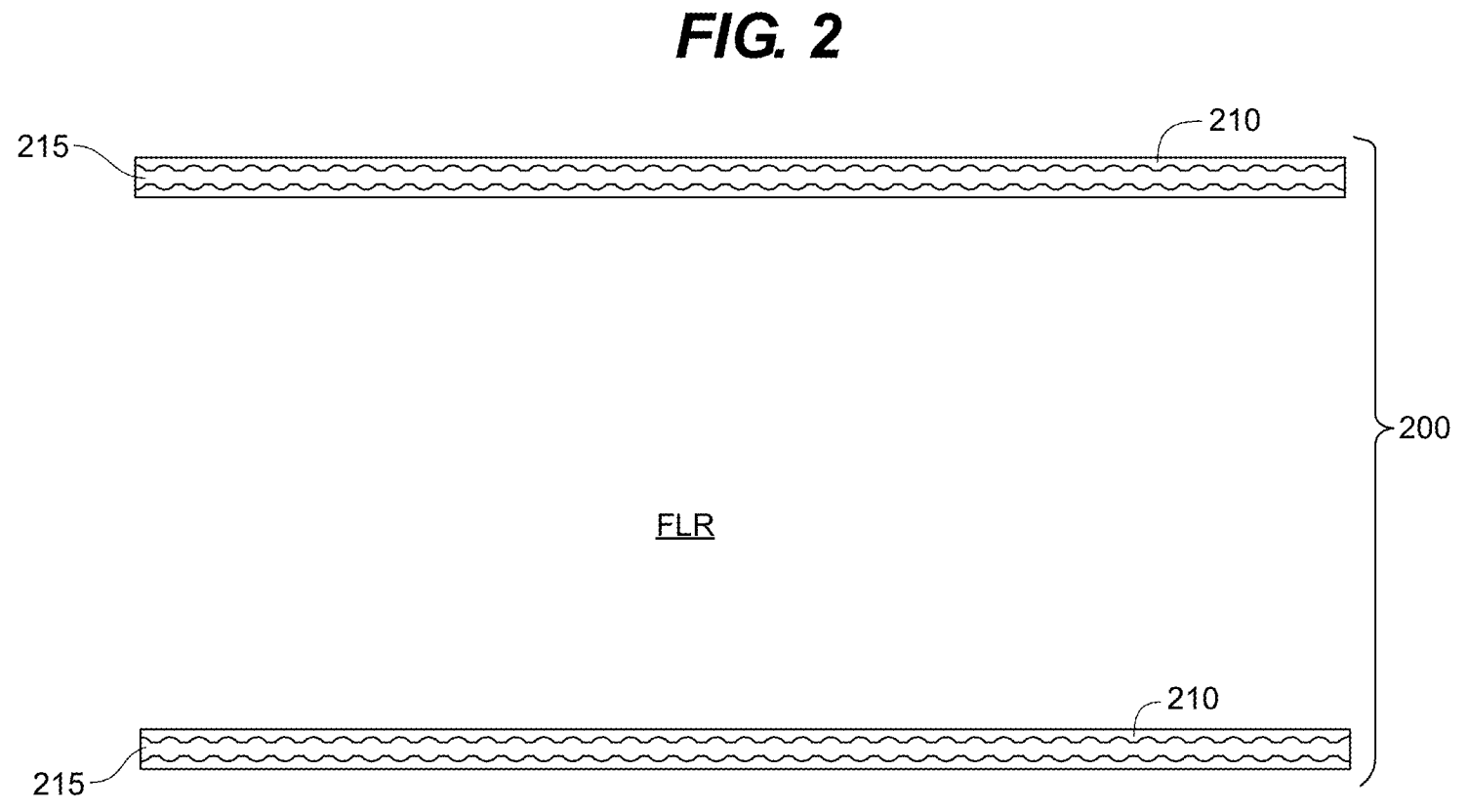

In a first group of embodiments, the aeromedical ambulance module 100 comprises a module base 1 that is configured to be mounted removably to an aircraft seat track 200. In more detail, the module base 1 preferably is configured to be mounted removably to two spaced-apart rails 210 of the aircraft seat track 200. Reference is made to FIGS. 1 and 2. As will be appreciated by those of skill in the present field, the floor FLR of an aircraft can have (e.g., can be equipped with) an aircraft seat track 200 comprising two spaced-apart rails 210.

Preferably, each rail 210 of the aircraft seat track 200 defines a mount channel 215. This can be appreciated by referring to FIGS. 1-6. The illustrated rails 210 are parallel to each other.

Figure 3:
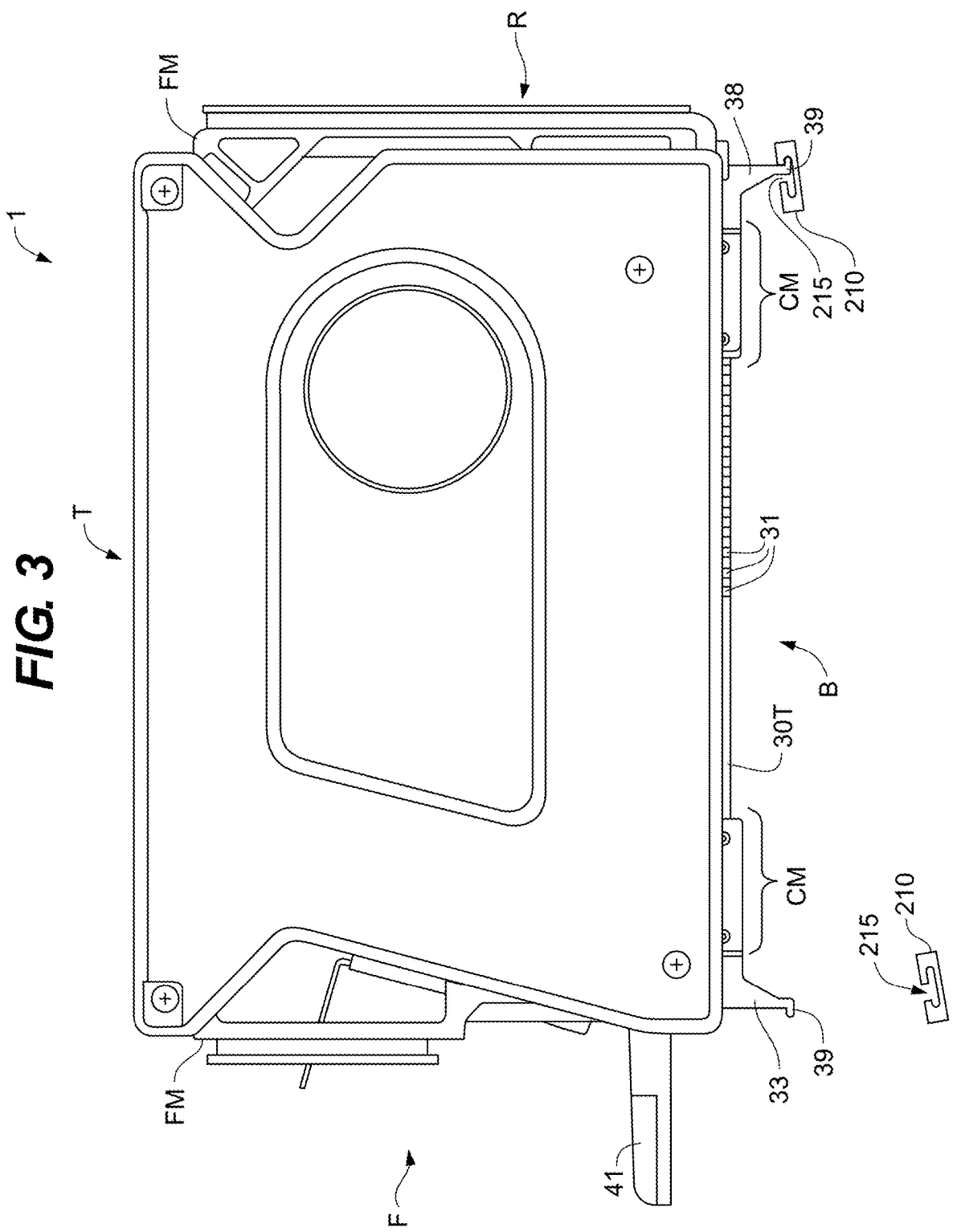
FIG. 3 is an end view of the module base of FIG. 1, shown at an initial stage in the process of being mounting to two spaced-apart rails of an aircraft seat track.

The illustrated module base 1 has a front side F, a bottom side B, and a rear side R. Reference is made to FIG. 3. When the module base 1 is operably mounted to the aircraft seat track 200, there preferably is no (i.e., the system preferably is devoid of an) adaptor assembly between the bottom side B of the module base and the aircraft seat track 200. This is perhaps best shown in FIG. 5. Embodiments of this nature provide an elegant mounting solution by which the module base 1 can be releasably mounted directly to the aircraft seat track 200, without needing a separate adaptor assembly or other supplemental mounting hardware.

Each illustrated rail 210 comprises an elongated channel member, which bounds the mount channel 215. In the embodiment illustrated, the channel 215 in each rail 210 extends along the entire length of the rail. This, however, is not required.

Figure 6:
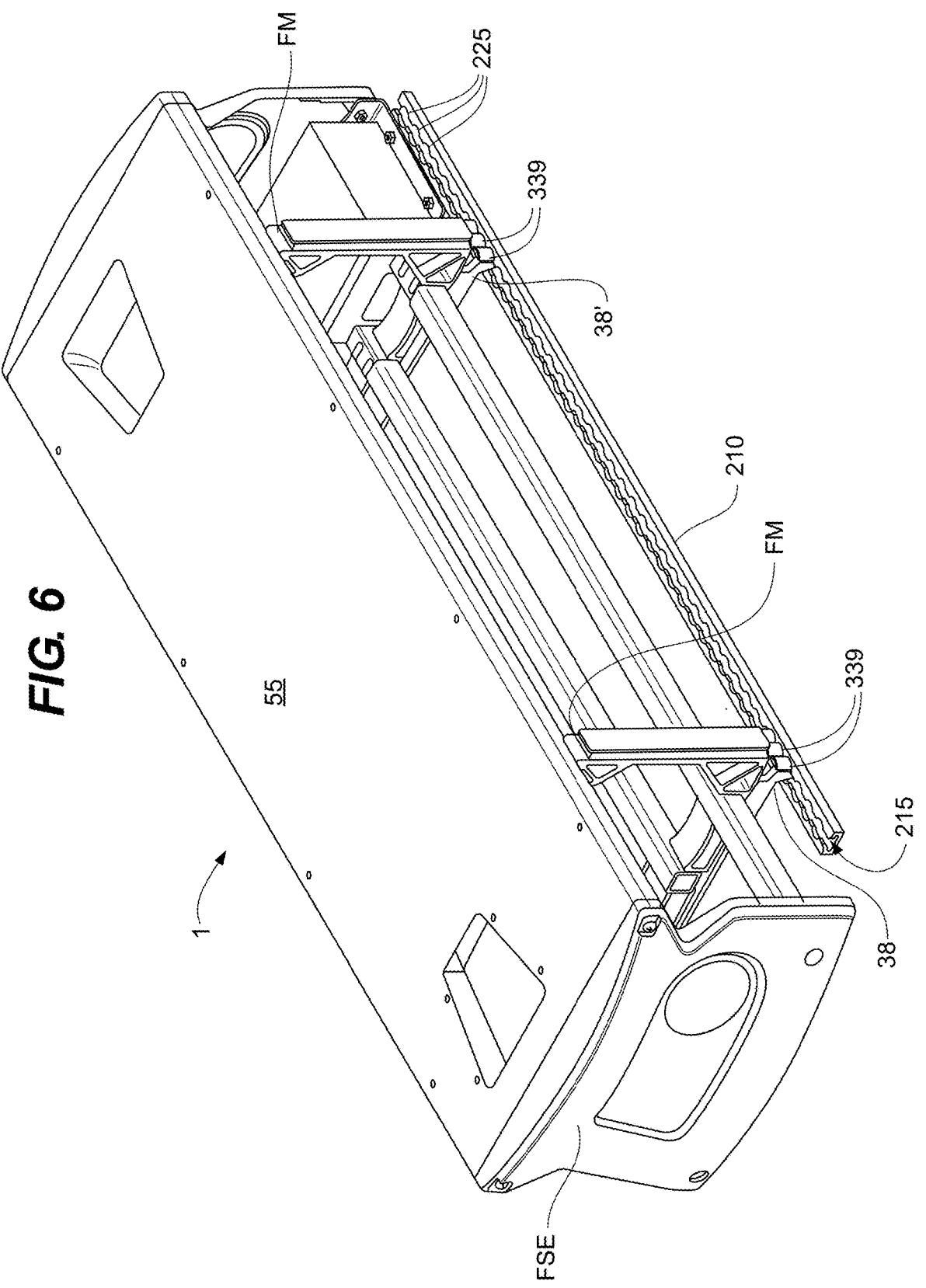
FIG. 6 is a perspective rear view of the module base of FIG. 1.

As is perhaps best shown in FIG. 6, each rail 210 can advantageously have (e.g., can bound or delineate) a series of seating regions 225 located (e.g., spaced-apart) along the channel 215. When provided, these seating regions 225 (which can comprise enlarged regions of the channel) can assist in providing a stable lock of the module base 1 to the rails 210. In the illustrated embodiment, the seating regions (or "scallops") 225 are each shown having a generally circular shape. It is to be appreciated, however, that various shapes can be used for the optional seating regions 225. For example, the seating regions can alternatively be generally square or rectangular, or they can be generally V-shaped.

When the module base 1 is locked (e.g., directly) onto such rails 210, the seating regions 225 (e.g., including surfaces of the rail bounding enlarged regions of the channel) can securely retain the module base 1 in a fixed longitudinal position on the rails. It will be appreciated that by locking the module base 1 onto the rails 210, it is also securely retained in a fixed lateral position relative to the rails. Thus, the module base 1 when locked to the aircraft seat track 200 is retained in a fixed position, and thus is prevented from moving longitudinally or laterally relative to the rails.

In the embodiment illustrated, all the seating regions 225 form portions of (and are open to an underlying base region of) the channel 215. In more detail, the illustrated rail configuration comprises a series of slot-like regions positioned alternately with the series of seating regions 225 along the length of the rail 210. The channel 215 is more narrow at the slot-like regions than at the seating regions 225. This is perhaps best appreciated by referring to FIGS. 1, 2, and 6. In the embodiment illustrated, all the seating regions 225 and all the slot-like regions form portions of (and are open to one another and to the underlying base region of) the channel 215. It is to be appreciated, however, that these rail features are not required; many different rail configurations can be used.

The module base 1 comprises a mount assembly 40 having an unlocked configuration and a locked configuration. When in the locked configuration, the mount assembly 40 is configured to securely (e.g., rigidly) lock the module base 1 to the floor FLR (e.g., to rails 210 of an aircraft seat track 200 on the floor) of an aircraft. The mount assembly 40 preferably comprises one or more components (optionally one or more legs) that move between release and engagement positions when the mount assembly is moved between the unlocked and locked configurations.

Figure 4:
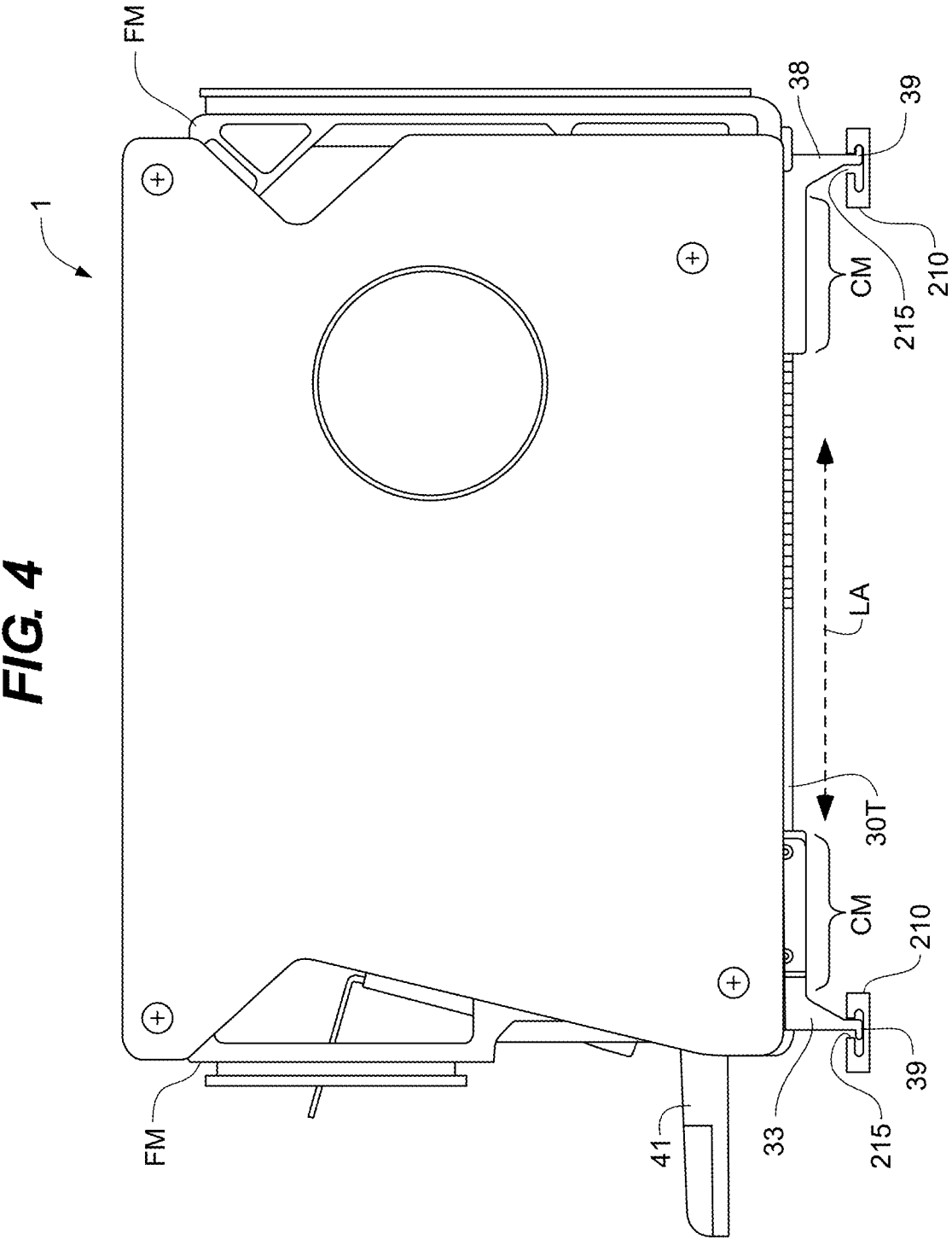
FIG. 4 is another end view of the module base of FIG. 1, shown at a subsequent stage in the process of being mounted to two spaced-apart rails of an aircraft seat track.
Figure 5:
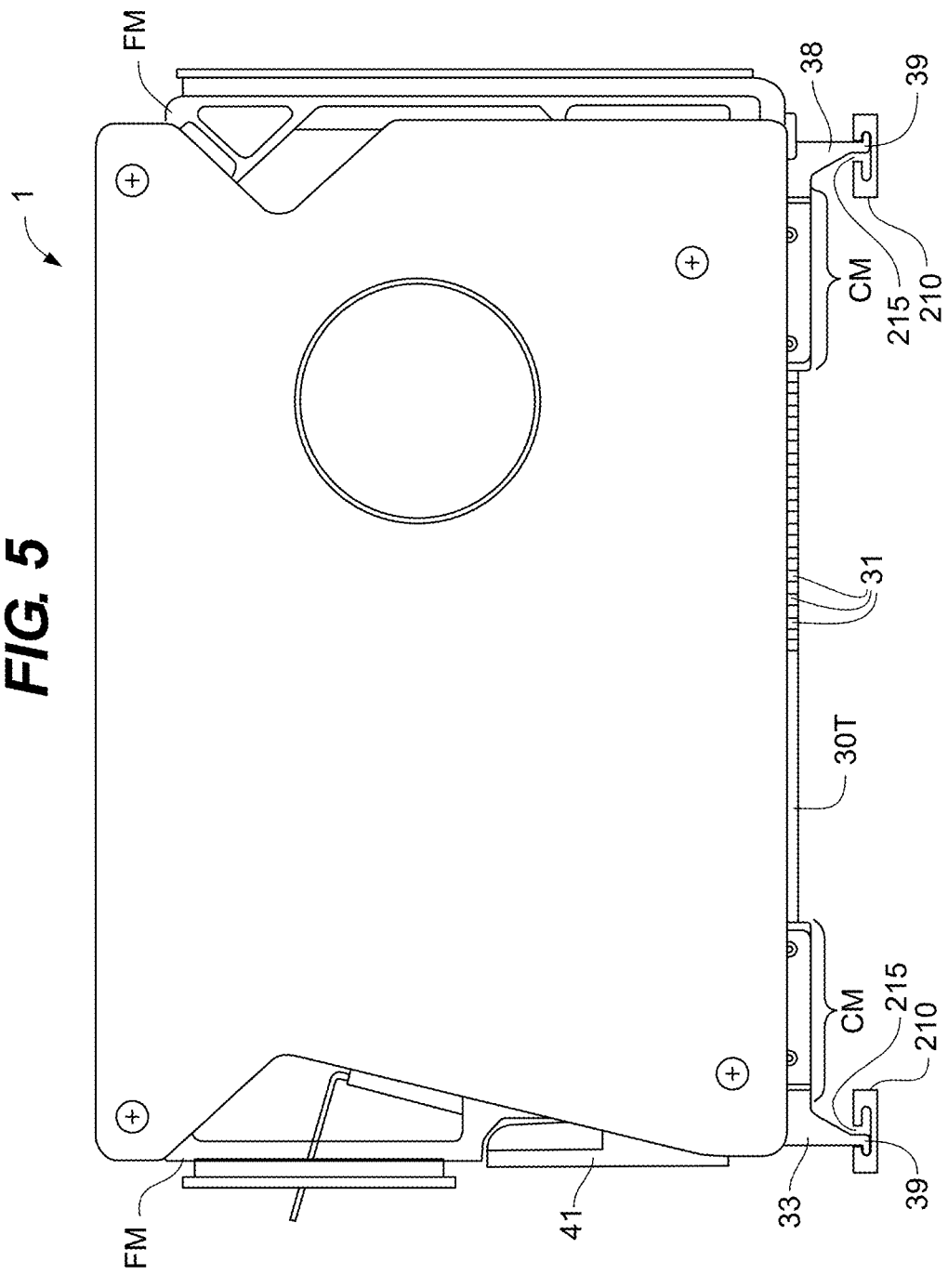
FIG. 5 is still another end view of the module base of FIG. 1, shown at a final stage in the process of being mounted to two spaced-apart rails of an aircraft seat track.

Preferably, the mount assembly 40 is configured to be adjusted between the unlocked configuration and the locked configuration by a tool-free operation. Reference is made to FIGS. 4 and 5. Here, the mount assembly 40 is configured to move between the unlocked configuration and the locked configuration in response to movement of an actuator (e.g., pivoting of a lever) 41 between first and second positions. It is to be appreciated, however, that this is by no means required. Other embodiments can involve using one or more tools to adjust the mount assembly between unlocked and locked configurations. For example, rather than pivoting a lever for actuation, a screw driver of the like may be used to rotate a bolt or other threaded member so as to drive movement of the (or each) lock foot. Many other options will be apparent to those of skill in the present field given the present teaching as a guide.

The actuator 41 can optionally be located on a front side F of the module base 1. This is shown, for example, in FIGS. 1 and 3-5. Here, the actuator 41 is located on the front side F of the module base 1 adjacent an instrument panel. In other embodiments, one or more actuators are located on the top side of the module base. In still other embodiments, an actuator can be located on an end of the module base. In some cases, first and second actuators are located respectively on first and second ends of the module base. Other actuator locations can also be used.

In the embodiment illustrated, the mount assembly 40 comprises a first lock foot 33 and a first base foot 38. Reference is made to FIGS. 3-5. Here, the first lock foot 33 is an adjustable foot, which is moveable (e.g., relative to the first base foot 38) between a release position and an engagement position. With continued reference to FIGS. 3-5, when the illustrated mount assembly 40 is in the unlocked configuration (see FIGS. 3 and 4), the first lock foot 33 is in the release position, and when the mount assembly is in the locked configuration (see FIG. 5), the first lock foot is in the engagement position.

In the embodiment shown in FIG. 5, the first lock foot 33 and the first base foot 38 are on (e.g., are integrated into) the bottom side B of the module base 1. As illustrated, there preferably is no adaptor assembly or fittings (e.g., or any other structure) between the bottom side of the module base and the rails 210 of the aircraft seat track 200. Instead, the first lock foot 33 and the first base foot 38 preferably are releasably attached directly to the rails 210 of the aircraft seat track 200.

Preferably, the first lock foot 33 is further from the first base foot 38 when the mount assembly 40 is in the locked configuration than when the mount assembly is in the unlocked configuration. This can be appreciated by comparing FIG. 5 (showing the locked configuration) with FIGS. 3 and 4 (showing the unlocked configuration).

Another possibility is to configure the system for the reverse situation; where the first lock foot is closer to the first base foot when the mount assembly is in the locked configuration than when the mount assembly is in the unlocked configuration. Various arrangements of this nature can be used as well.

In FIGS. 1 and 6, the aeromedical ambulance module comprises a module base 1 having a length and a width. As can be seen, the length is greater than the width. When provided, the first lock foot 33 and the first base foot 38 preferably are spaced apart from each other along the width of the module base 1, such that the first lock foot is configured to move in a lateral direction relative to the first base foot between the engagement position and the release position. As can be appreciated in FIG. 1, the lateral direction (or "width direction") of the module base 1 is transverse to the length of the module base. In FIG. 1, the length of the module base 1 is parallel to illustrated axis CA, while the width of the module base is transverse (e.g., perpendicular) to the length and to axis CA. The same length and width conventions apply to the embodiment group discussed below relative to FIGS. 10-18, as well as to the embodiment described below relative to FIGS. 19-23C.

Preferably, the first lock foot 33 and the first base foot 38 are configured: (i) to move away from each other (optionally directly away from each other) when the mount assembly 40 is adjusted from the unlocked configuration to the locked configuration, and (ii) to move toward each other (optionally directly toward each other) when the mount assembly 40 is adjusted from the locked configuration to the unlocked configuration. As noted above, however, the system can alternatively be configured for the reverse situation. Moreover, while the illustrated first lock foot 33 and first base foot 38 are located the same distance along the length of the module base 1, this is not required. Instead, the first lock foot and the first base foot can be located different distances along the length of the module base.

Preferably, the mount assembly 40 is configured such that when it is in the locked configuration, the first lock foot 33 is positioned to directly engage, and lock to, a first of the spaced-apart rails 210 of the aircraft seat track 200. In more detail, when the illustrated mount assembly 40 is in the locked configuration, the first lock foot 33 and the first base foot 38 are positioned to respectively engage, and lock to, first and second spaced-apart rails 210 of the aircraft seat track 200. Reference is made to FIG. 5.

In some embodiments, the aeromedical ambulance module 100 is mounted in an aircraft, such that the first lock foot 33 is directly engaged with, and locked to, a first of the spaced-apart rails 210 (e.g., a front rail) of the aircraft seat track 200, while the first base foot 38 is directly engaged with, and locked to, a second of the spaced-apart rails (e.g., a rear rail) of the aircraft seat track. This is shown in FIG. 5.

In the embodiment illustrated in FIGS. 1, 5, and 6, the first lock foot 33 has a flange 39, the first base foot 38 has a flange 39, the first of the two spaced-apart rails 210 of the aircraft seat track 200 has a channel 215, the second of the two spaced-apart rails 210 of the aircraft seat track has a channel 215, the flange 39 of the first lock foot 33 is received in the channel 215 of the first of the two rails 210 of the aircraft seat track, and the flange 39 of the first base foot 38 is received in the channel 215 of the first of the two spaced-apart rails 210 of the aircraft seat track. It is to be appreciated, however, that in other embodiments, the lock and base feet can have different configurations, including some without flanges.

In more detail, in the embodiment illustrated, the flange 39 of the first lock foot 33 and the flange 39 of the first base foot 38 project away from each other, so as to be configured as opposing flanges. This is perhaps best shown in FIG. 3.

Figure 7:
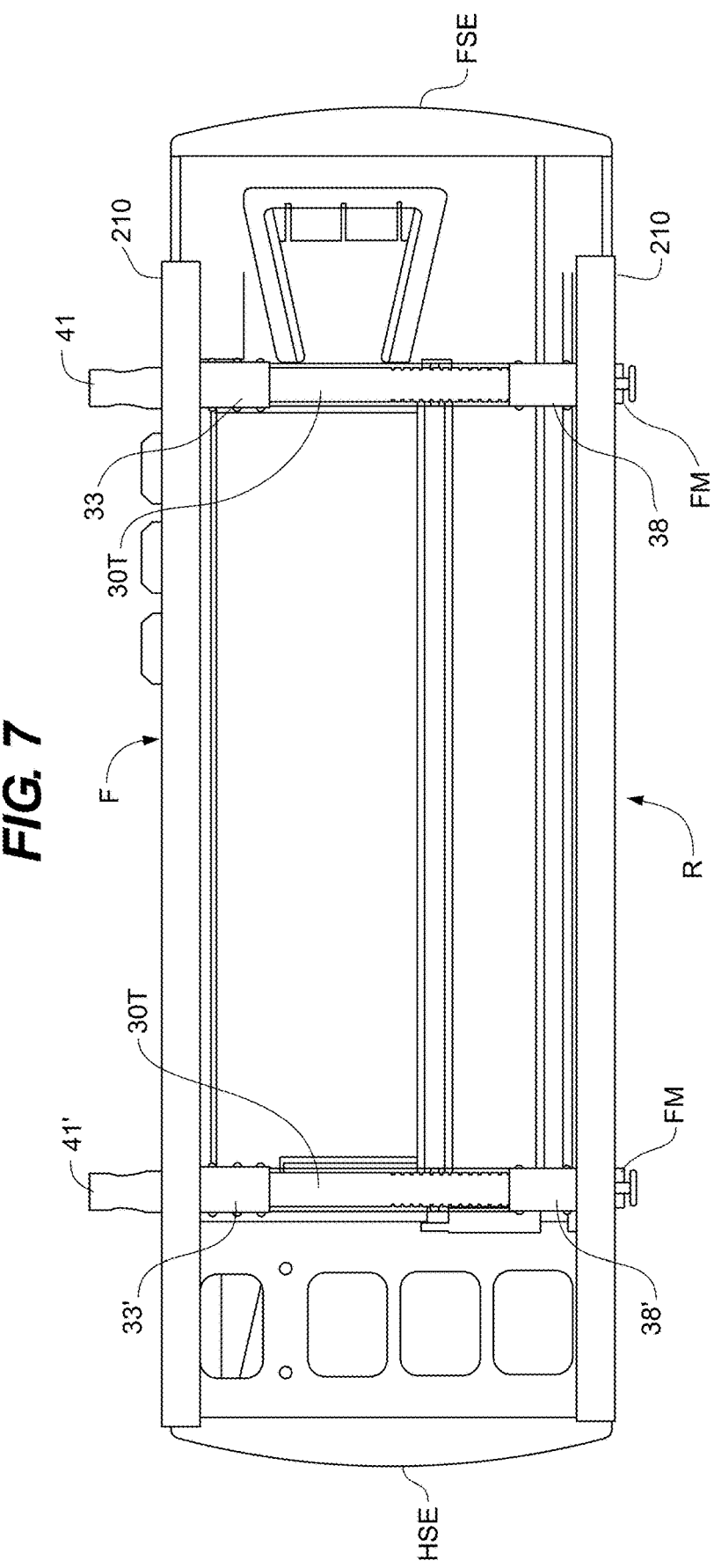
FIG. 7 is a bottom view of the module base of FIG. 1, showing two mount assemblies each in an unlocked configuration.
Figure 8:
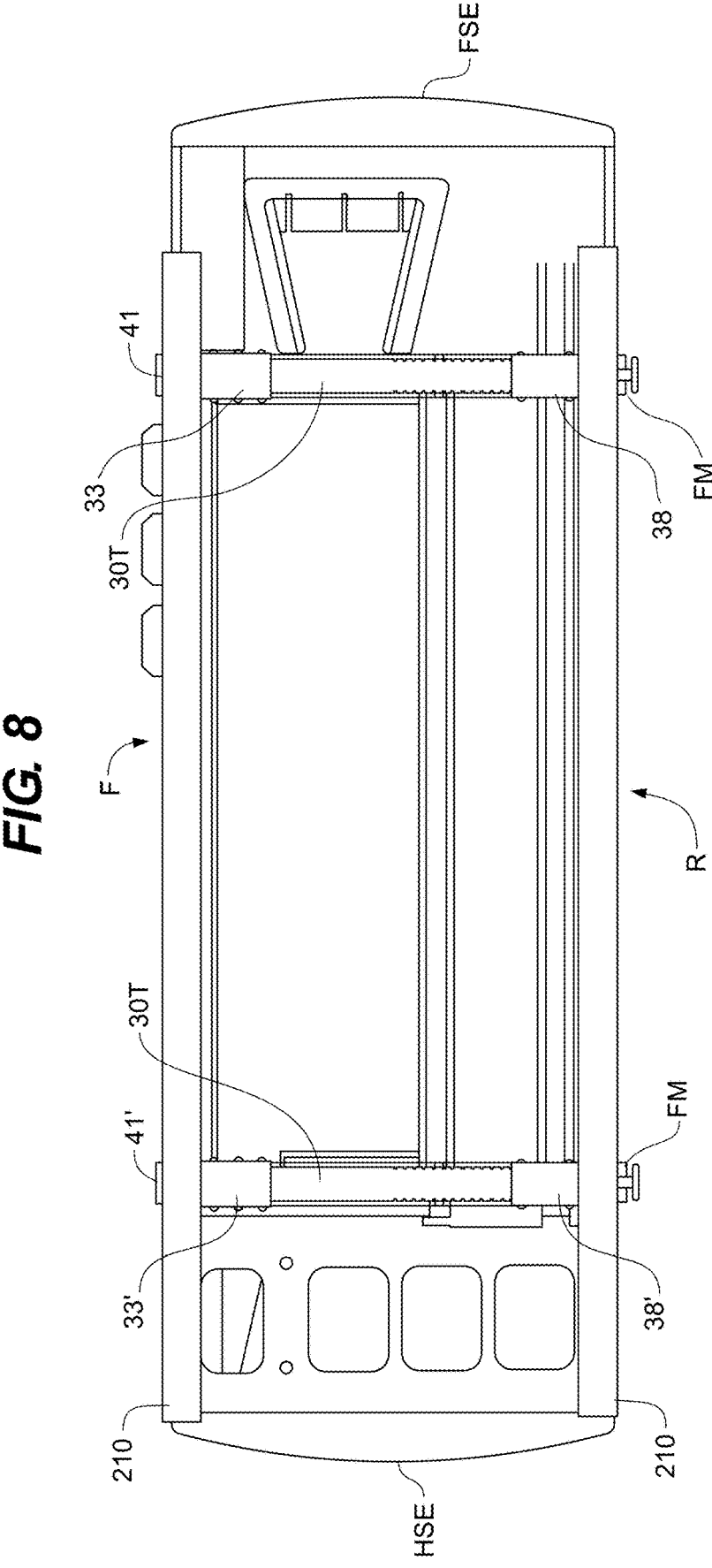
FIG. 8 is another bottom view of the module base of FIG. 1, showing the two mount assemblies each in a locked configuration.

Preferably, the first lock foot 33 is slidably disposed on a first transverse rail 30T. When provided, the first transverse rail 30T is on the bottom side B of the module base 1. This is perhaps best shown in FIGS. 4, 5, 7, and 8. In more detail, the first lock foot 33 preferably is slidable along the first transverse rail 30T between the release position (see FIGS. 4 and 7) and the engagement position (see FIGS. 5 and 8). In the embodiment illustrated, the first transverse rail 30T extends along the width of the module base 1.

In the embodiment illustrated, the first base foot 38 is adjustably disposed on the first transverse rail 30T. This enables an initial adjustment of the separation between the illustrated first lock and base feet 33, 38. This, however, is not required. For example, an alternative is to have the first base foot permanently fixed in a stationary position on the bottom side of the module base. Preferably, though, the first base foot 38 is adjustable along the width of the module base 1, so as to be changeable to accommodate the different rail separation distances of different aircraft seat tracks.

In some alternate embodiments of this nature, the first lock foot and the first base foot are not mounted on a common rail, yet the lateral position of the first base foot is adjustable. For example, the first base foot can be mounted on a separate rail, or it can be directly mounted to different mounting structures on the bottom side of the module base. Given the present teaching as a guide, skilled artisans will appreciate that various other embodiments can be used for enabling an initial adjustment of the separation between the feet.

Thus, the first base foot 38 preferably is adjustable between different positions along the width of the module base 1. In such cases, the lateral separation between the first base foot 38 and the first lock foot 33 can be adjusted such that those two feet can be aligned respectively with (and mounted respectively on) two rails 210 of a given aircraft seat track 200. The two rails of one aircraft seat track may be separated by a different distance than the two rails of another aircraft seat track. It can therefore be advantageous to enable adjusting the separation of the feet.

Figure 9:
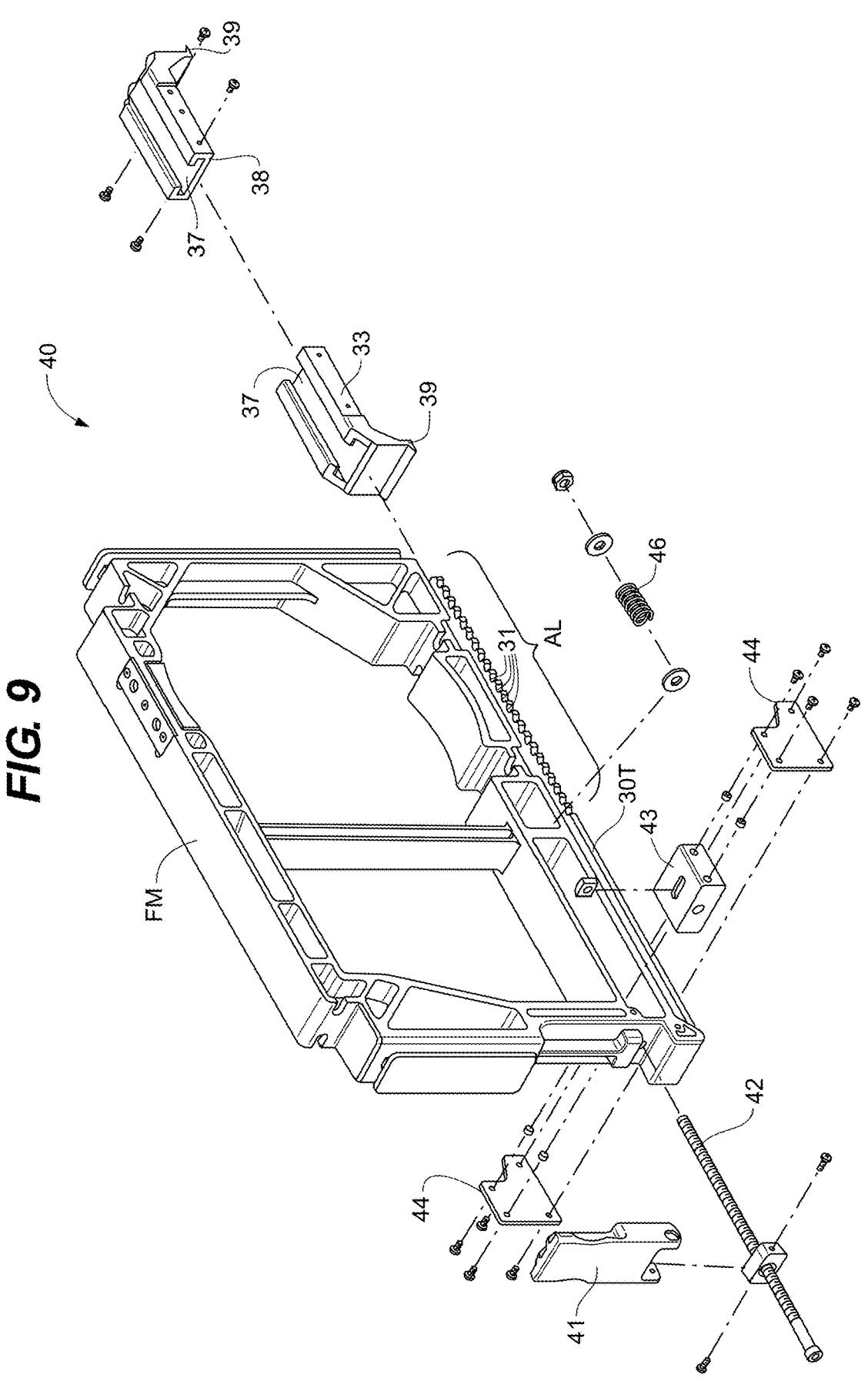
FIG. 9 is an exploded view of a mount assembly of FIGS. 7 and 8.

As is perhaps best shown in FIG. 9, the first transverse rail 30T has a series of detents 31 spaced apart along an anchor length AL of the first transverse rail. As a result, the illustrated first base foot 38 is configured to be fixed releasably at any one of a series of lateral locations along the anchor length AL of the first transverse rail 30T, by engaging the first base foot with one or more (e.g., a plurality of) desired detents 31. In FIG. 9, the detents 31 comprise recesses (e.g., notches) that are formed in the first transverse rail 30T and are spaced apart along its anchor length AL. In the embodiment shown, a plurality of (e.g., four) screws carried by the first base foot 38 can be rotated so as to advance into engagement with a plurality of (e.g., four) respective detents 31. It is to be appreciated, however, that the particular mechanism for locking the first base foot releasably at different lateral positions along the first transverse rail is not limiting to the present invention.

As noted above, the illustrated module base 1 has a front side F, a bottom side B, and a rear side R. Preferably, the first lock foot 33 is located on the bottom side B of the module base 1 at a position closer to the front side F than to the rear side R, and the first base foot 38 is located on the bottom side of the module base at a position closer to the rear side than to the front side. This can be seen in FIGS. 3-5, 7, and 8.

Thus, the module base 1 can optionally include a plurality of feet, such as at least one lock foot 33 and at least one base foot 38. When provided, each foot can be provided in different configurations. In some cases, each foot has an engagement portion EP. The engagement portion EP can comprise a flange 39, as described above and illustrated. Additionally or alternatively, each foot can optionally have a channel portion CM, which preferably has a channel 37. In such cases, the channel portion CM of each leg can optionally be configured to receive and slide along (and in some cases receives) a transverse rail 30T on the bottom side B of the module base 1.

Figure 10:
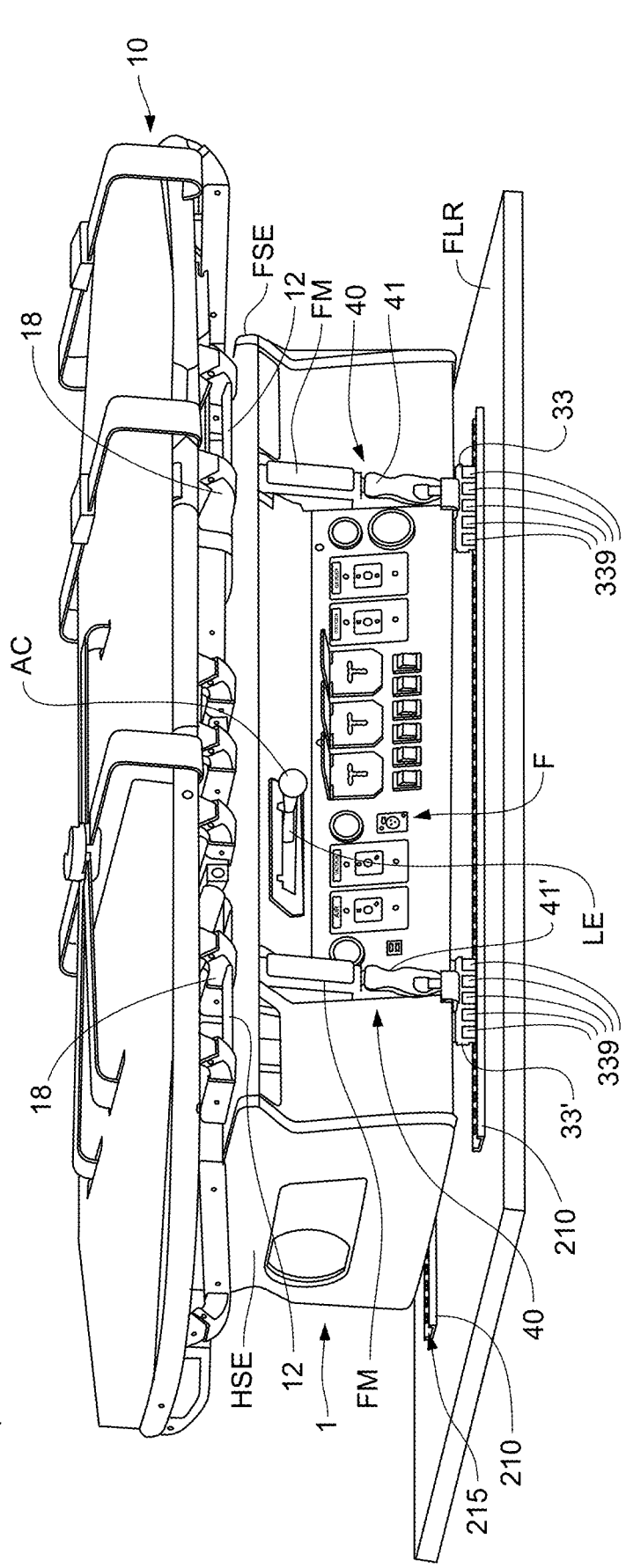
FIG. 10 is a perspective front view of an aeromedical ambulance module including a module base and a stretcher in accordance with certain embodiments of the present invention.

Furthermore, some embodiments involve a leg construction wherein an engagement portion EP of the leg includes a plurality of geometrical features that match a shape of the seating regions (e.g., scallops) of rail 210. In some embodiments, each leg has an engagement portion with such geometrical features. In other embodiments, a lock foot 33 has an engagement portion without such geometrical features while a base foot 38 has an engagement portion with a plurality of such geometrical features. Reference is made to FIG. 9. In other embodiments, each lock foot 33 has an engagement portion with a plurality of such geometrical features. Reference is made to FIG. 10. If desired, each lock foot 33 and each base foot 38 can have an engagement portion with a plurality of such geometrical features.

Figure 25:
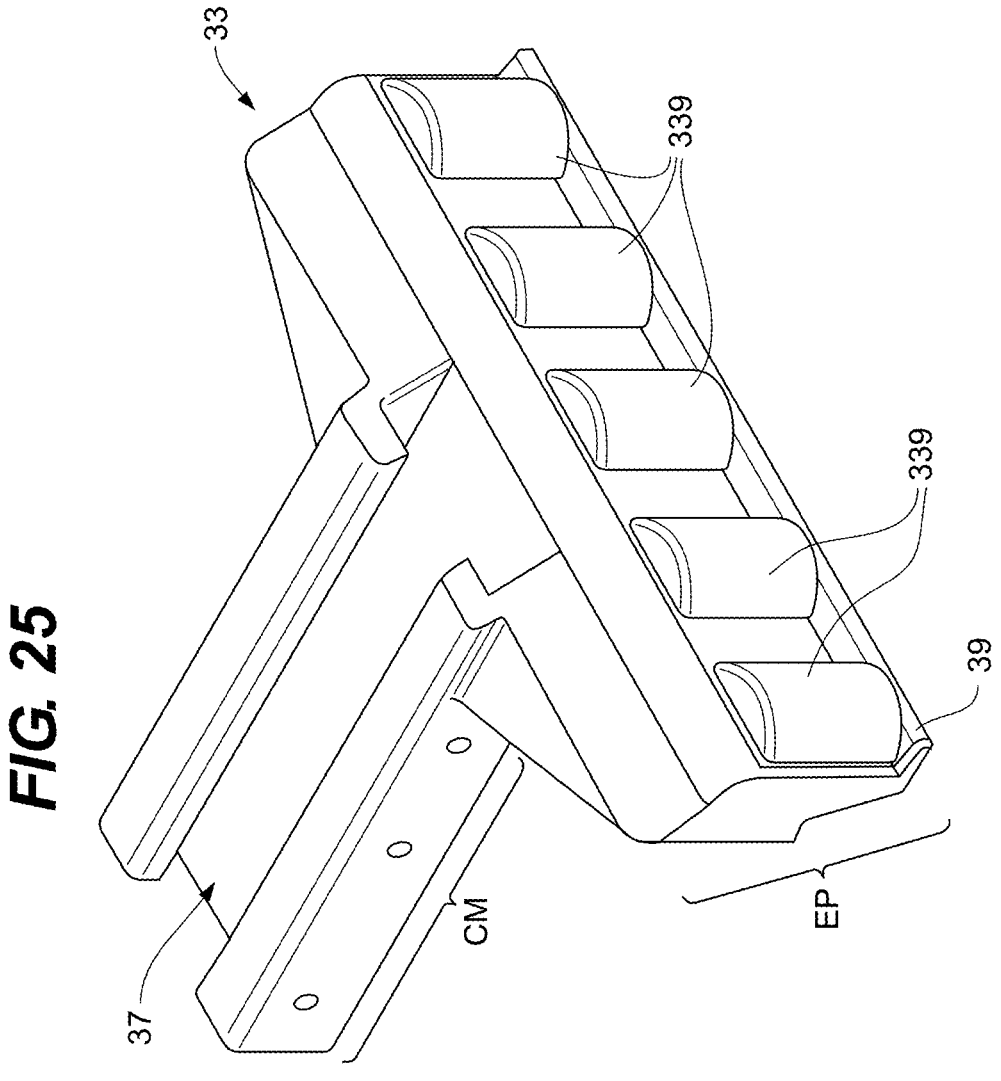
FIG. 25 is a perspective view of a leg construction that can be used in certain embodiments of the invention.
Figure 26:
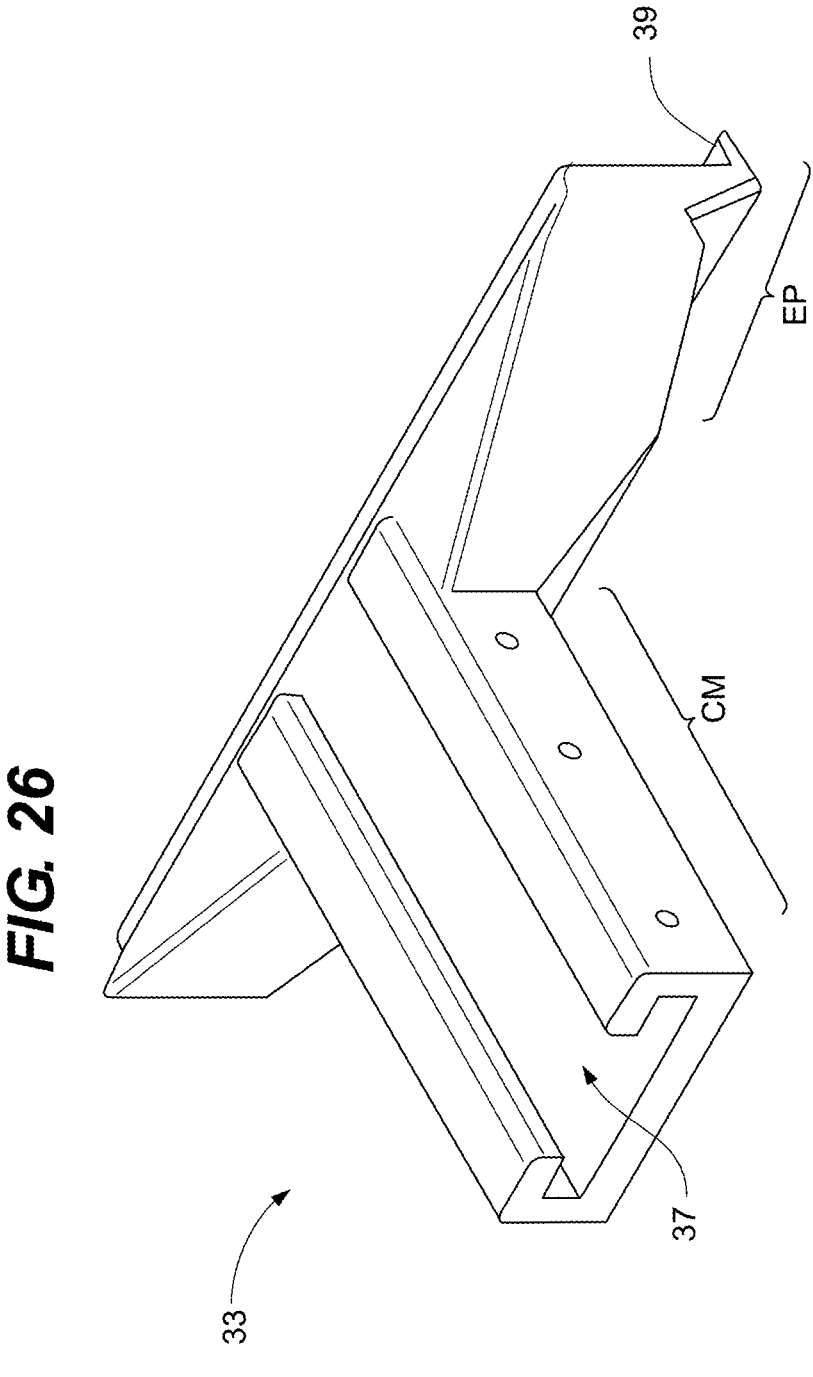
FIG. 26 is another perspective view of the leg construction of FIG. 25.
Figure 27:
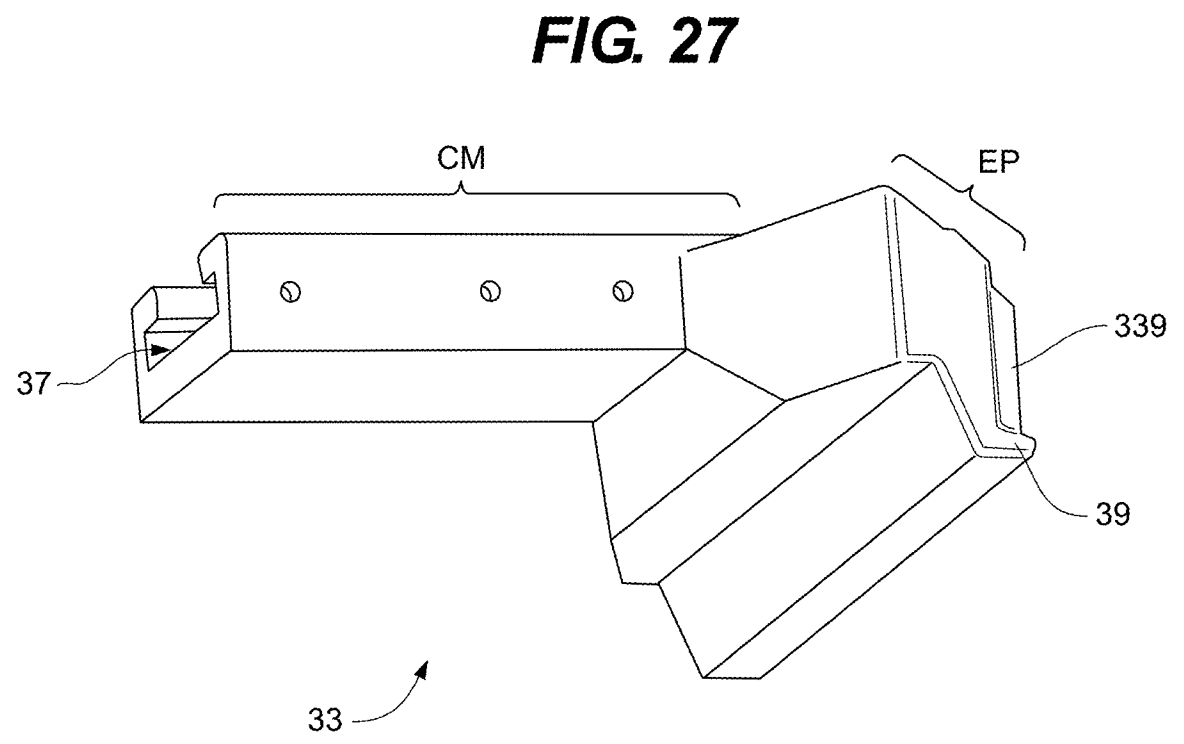

When a leg has an engagement portion with a plurality geometrical features each matching a shape of seating regions (e.g., scallops) of rail 210, the geometrical features may comprise generally semicircular bosses (e.g., shoulders) that project from the engagement portion EP of the leg. This is shown, for example, in FIGS. 10, 19-22, 24, and 25. Here, each leg has an elongated configuration (e.g., elongated parallel to a length of a respective rail 210), such that its plurality of geometrical features is configured to engage a plurality of seating regions of rail 210. If desired, each such leg can optionally have three or more (e.g., five) such bosses (e.g., shoulders) or other geometrical features. Arrangements of this nature may provide advantages when locking to the seat track. The structural configuration of one suitable, non-limiting foot design is detailed in FIGS. 25-27.

The illustrated module base 1 includes a first actuator 41 operably coupled to the first lock foot 33. The first actuator 41 has an open position (see FIGS. 1, 3, 4, and 7) and a closed position (see FIGS. 5 and 8). In the embodiment illustrated, when the first actuator 41 is in the open position, the first lock foot 33 is in the release position (perhaps best shown in FIG. 4), and when the first actuator is in the closed position, the first lock foot is in the engagement position (perhaps best shown in FIG. 5). As can be understood by comparing FIGS. 3 and 4, when the first lock foot 33 is in the release position, it can be freely inserted into the channel 215 of a rail (e.g., a front rail) 210 of the aircraft seat track 200. To then lock the first lock foot 33 to that rail 210, an operator can simply move the first actuator 41 from the open position to the closed position (e.g., without having to use any tool and/or with a single motion). This can be appreciated by comparing FIGS. 4 and 5.

In the embodiment illustrated, the first actuator 41 comprises a pivotable lever, e.g., a pivotable cam lever. However, in other embodiments, rather than pivoting a lever for actuation, a screwdriver or the like may be used to rotate a bolt or other threaded member so as to drive movement of the (or each) lock foot. As noted above, many other options are possible as well.

Preferably, the first actuator 41 is located on the front side F of the module base 1, while the first lock foot 33 and the first base foot 38 are located on the bottom side B of the module base. Reference is made to FIG. 3. In other embodiments, the actuator(s) can be located on one or both of the head-side and feet-side ends of the module base. In still other embodiments, the actuator(s) can be located on the top of the module base.

In the illustrated embodiment, the mount assembly 40 is configured such that the first base leg 38 is maintained in a fixed position when the first lock leg 33 is moved between the engagement position and the release position. This is shown in FIGS. 4 and 5.

When the module base is attached to the aircraft seat track, there preferably are three or more (e.g., four) attachment points between the module base and the aircraft seat track. In such embodiments, the connection between the module base and the aircraft seat track at each attachment point is releasable. Such releasable connections preferably are rigid connections, which anchor the module base in a fixed position, thus preventing it from moving longitudinally or laterally relative to the aircraft seat track.

While four attachment points are preferred (as shown in the illustrated embodiment), some alternative embodiments provide only three attachments points. As one example, there can be an elongated, single attachment between the module base and the rear rail, while the module base has two longitudinally spaced-apart attachment points with the front rail. As another example, there can be an elongated, single attachment between the module base and the front rail, while the module base has two longitudinally spaced-apart attachment points with the rear rail. In still other embodiments, there are five or more (e.g., six) attachment points between the module base and aircraft seat track.

Thus, the module base 1 preferably includes two mount assemblies 40. In FIGS. 1 and 6, it can be appreciated that the illustrated module base 1 includes two mount assemblies 40 that are spaced apart from each other along the length of the module base. In more detail, a first of the mount assemblies 40 is adjacent the head-side end HSE of the module base 1, while a second of the mount assemblies 40 is adjacent the feet-side end FSE of the module base. The two illustrated mount assemblies 40 are positioned such that an instrument panel is located between them on the front F side of the module base 1. This, however, is not required. If desired, the positioning of these mount assemblies can be changed (e.g., they can be located at, or closer to, the ends of the module base) in other embodiments.

In the embodiment illustrated, the two mount assemblies 40 are shown as being identical to each other, except for being located at different positions along the length of the module base. In some alternate embodiments, however, the module base has two mount assemblies, and one is different from the other. Furthermore, there can alternatively be three or more mount assemblies. Still another possibility is to have a single mount assembly carry three or more (e.g., four) feet.

In the embodiment illustrated, the module base 1 includes a second lock foot 33' and a second base foot 38'. When provided, the second lock foot 33' preferably is an adjustable foot that is moveable (e.g., relative to the second base foot 38') between an engagement position and a release position. In more detail, when the illustrated second mount assembly 40 is in the unlocked configuration, the second lock foot 33' is in the release position, and when that mount assembly is in the locked configuration, the second lock foot is in the engagement position.

The second lock foot 33' can optionally have the same functionality, configuration, and features as the first lock foot 33. That is the case for the embodiment illustrated. Thus, the previous discussion of the first lock foot 33 (e.g., its functionality, configuration, and features) is to be understood to also apply to the second lock foot 33'.

When provided, the second lock foot 33' and the second base foot 38' preferably are located further along the length of the module base 1 than the first lock foot 33 and the first base foot 38. The second base foot 38' can optionally have the same functionality, configuration, and features as the first base foot 38. Thus, the previous discussion of the first base foot 38 (e.g., its functionality, configuration, and features) is to be understood to also apply to the second base foot 38'.

FIG. 9 is an exploded illustration of an exemplary mount assembly 40. Here, the mount assembly 40 comprises a frame member FM that carries the first lock foot 33, the first base foot 38, and the first actuator 41. Other components of this particular non-limiting mount assembly 40 are shown in exploded form, including threaded shaft 42, block 43, spring 46, and plates 44. The illustrated frame member FM has a generally rectangular configuration and includes four sides that are located respectively adjacent the front F, rear R, top T, and bottom B sides of the module base 1. This can be appreciated by referring to FIGS. 1 and 6-9. It is to be appreciated, however, that the details described in this paragraph are optional.

Thus, in various embodiments, the invention provides an aeromedical ambulance module 100 configured to be mounted in an aircraft.

Figure 11:
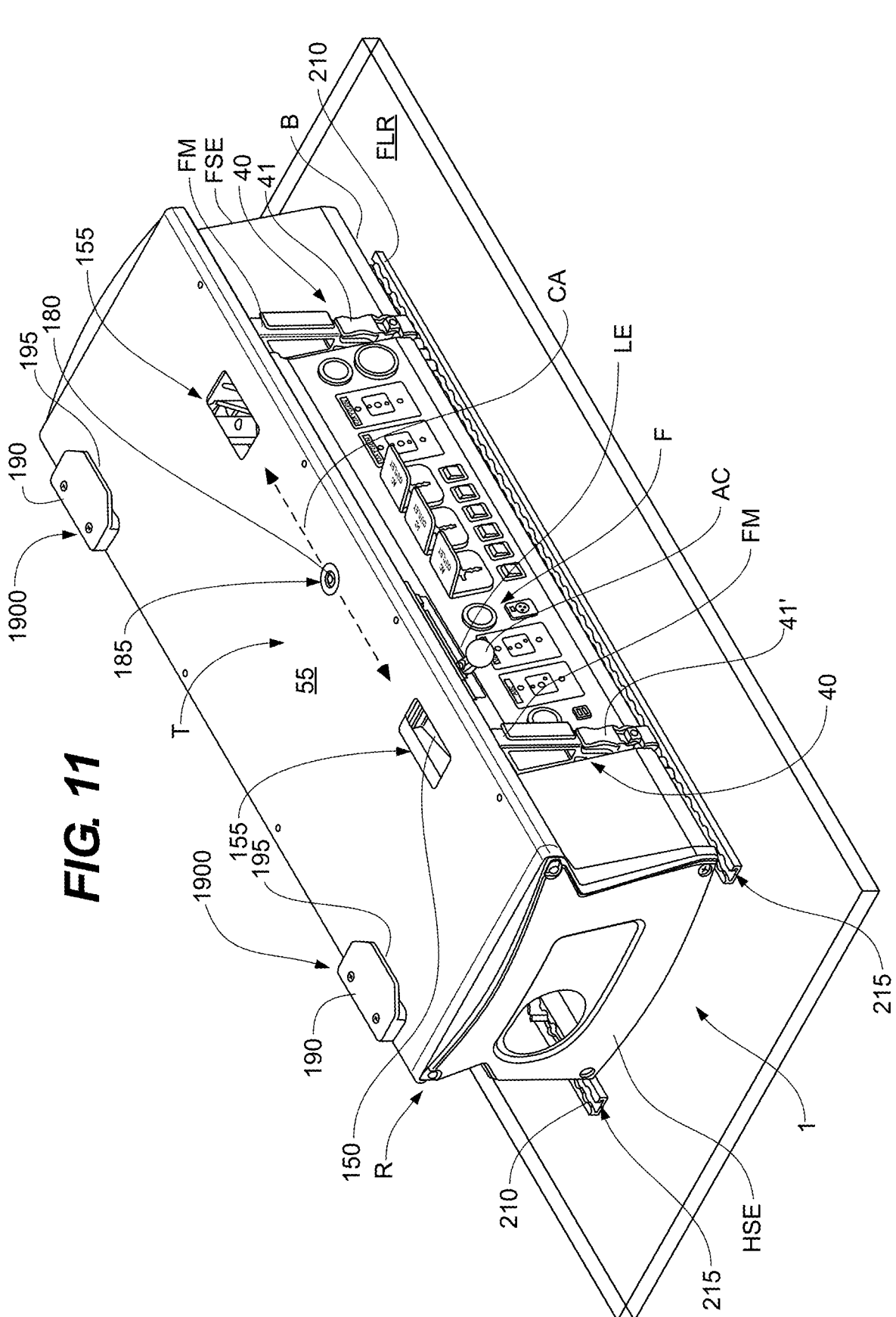
FIG. 11 is a perspective view of the module base of the aeromedical ambulance module of FIG. 10, with two latches of the module base in retracted positions.
Figure 13:
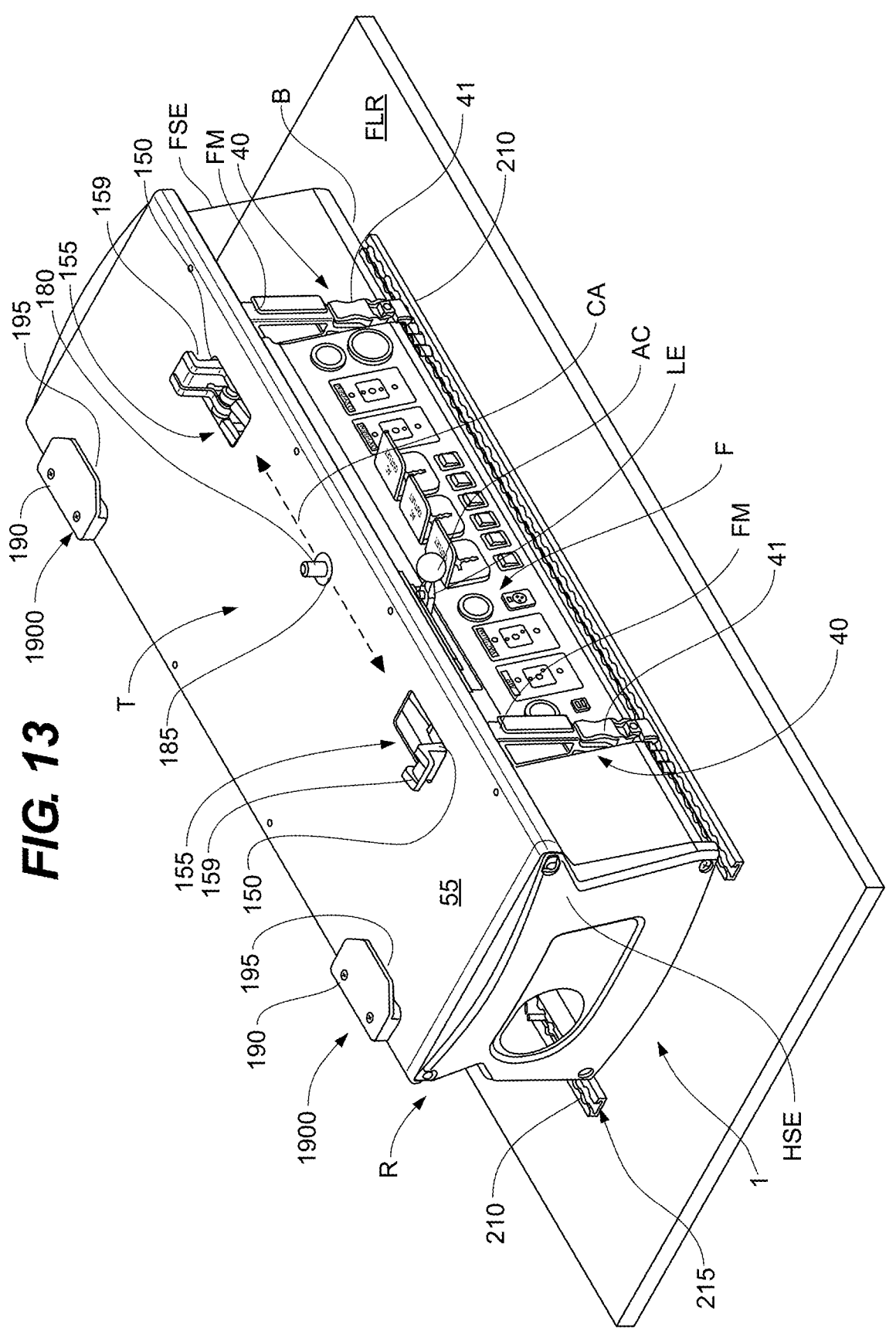
FIG. 13 is a perspective view of the module base of FIG. 11, with the two latches in extended positions.
Figure 19:
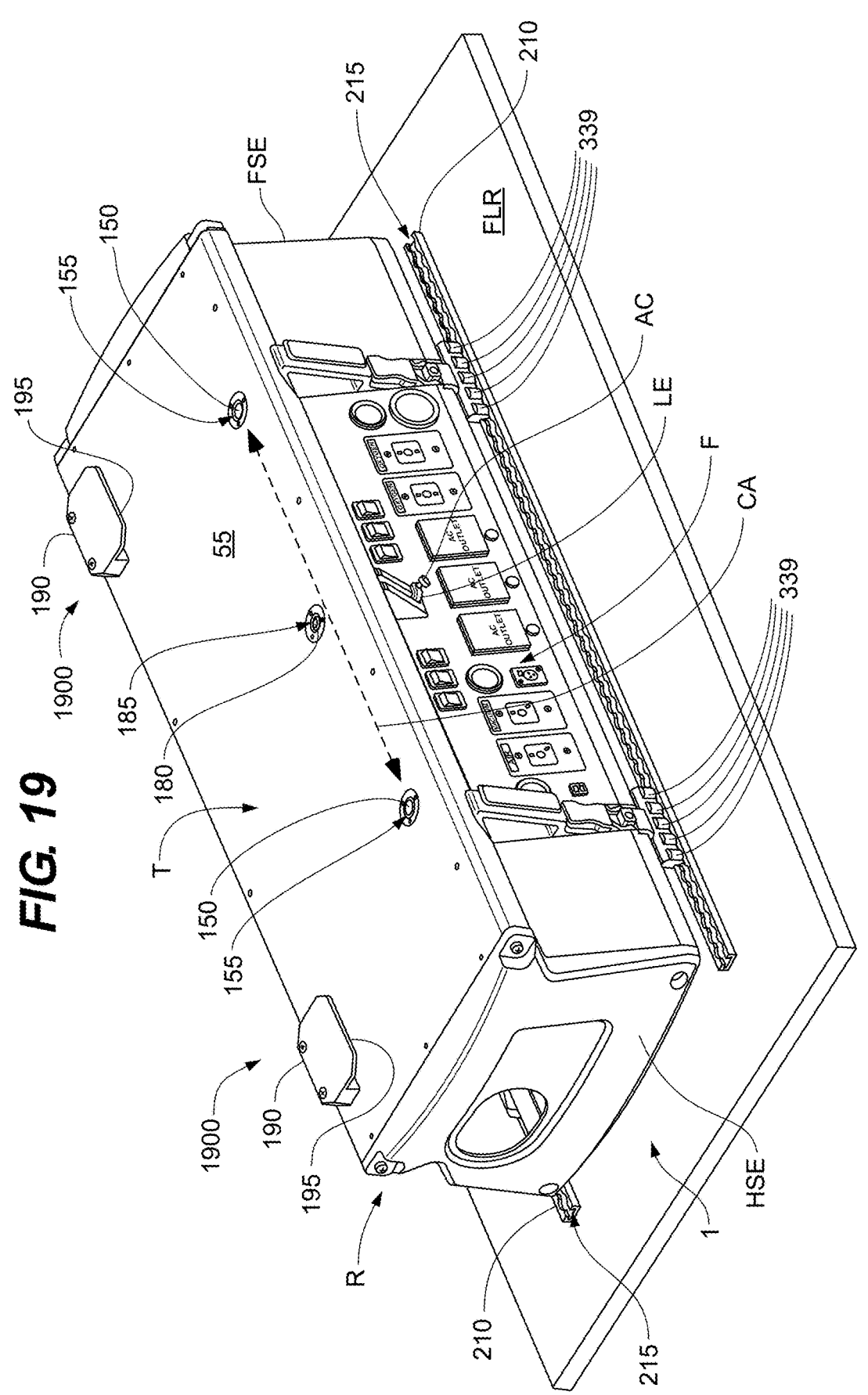
FIG. 19 is a perspective view of a module base of an aeromedical ambulance module in accordance with another embodiment of the invention, with two latches of the module base in retracted positions.

In one group of embodiments, the aeromedical ambulance module 100 comprises a module base 1 that includes one or more (e.g., two) latches 150 configured to releasably secure a stretcher 10 onto the module base. Preferably, the (or each) latch 150 has a retracted position and an extended position. Reference is made to FIGS. 11 and 13, as well as FIGS. 19 and 21. In these illustrated embodiments, the module base 1 includes two latches 150, each having a retracted position and an extended position. In FIGS. 11 and 19, each latch 150 is in the retracted position, whereas in FIGS. 13 and 21, each latch is in the extended position.

The (or each) latch 150, when in the retracted position, can optionally be retracted inside the module base 1, and when in the extended position, preferably projects upwardly from a top wall 55 of the module base. In FIG. 11, each latch 150 is in the retracted position and is retracted entirely inside the module base 1. This, however, is not required. Instead, each latch when in the retracted position can be located (at least in part) on top of the module base's top wall (rather than being retracted below it). Moreover, while the latches 150 in FIG. 11 are fully retracted inside the module base 1, each latch can alternatively project in part above the top wall 55 when in the retracted position. However, providing each latch 150 with a fully retracted profile when in the retracted position may advantageously reduce the likelihood of the stretcher 10 catching on the latches, and thus creating interference, when placing the stretcher 10 onto the module base 1.

In the present embodiment group, the module base 1 preferably includes an actuator AC operably coupled with the (or each) latch 150. In the embodiments of FIGS. 11 and 13 and FIGS. 19 and 21, the module base 1 includes an actuator AC operably coupled with two latches 150. The actuator AC preferably is a mechanical actuator (e.g., a manually-operable mechanical actuator), e.g., which is devoid of a motor and electrical components. This can optionally be the case in any embodiment of the present embodiment group.

Figure 21:
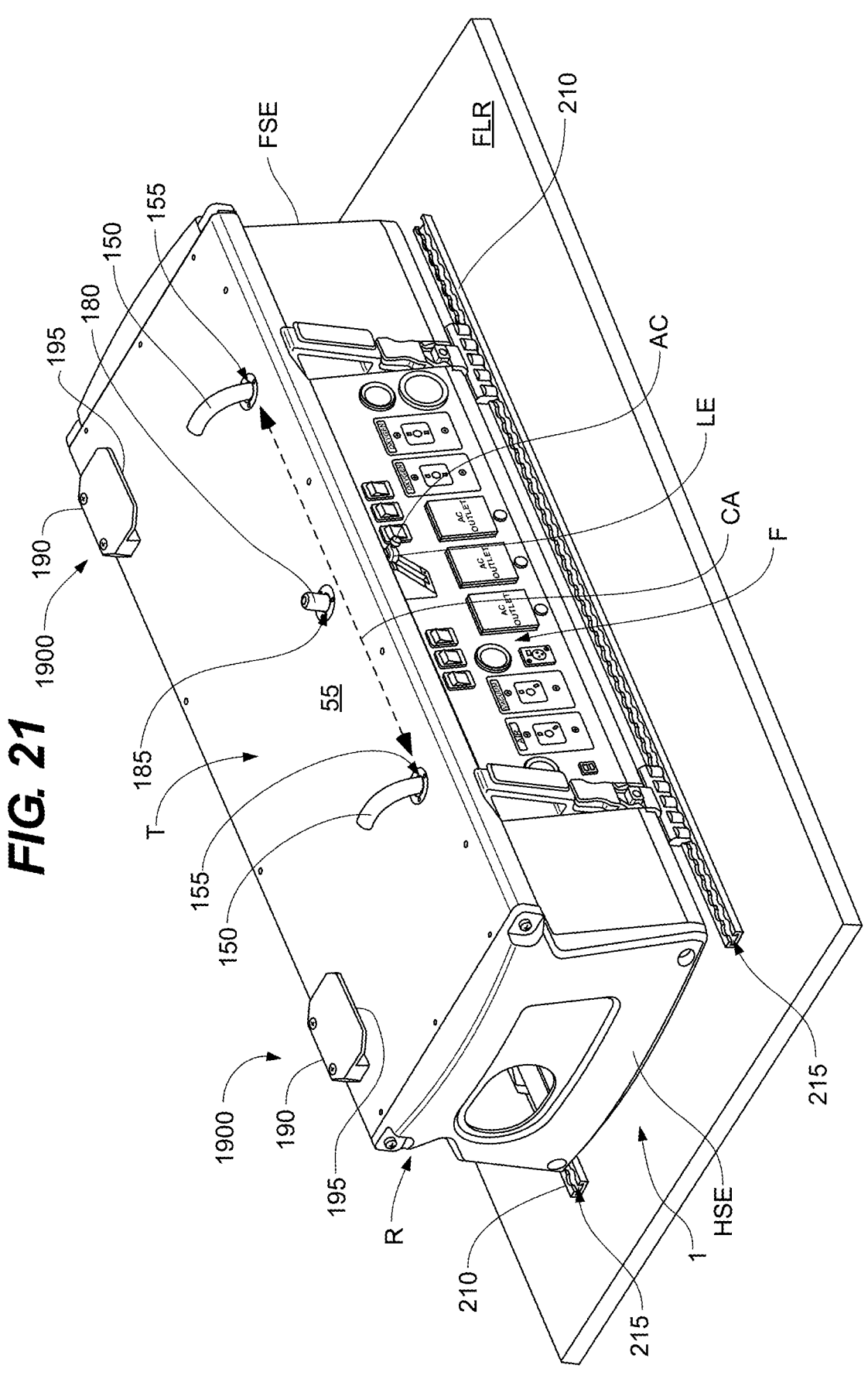
FIG. 21 is a perspective view of the module base of FIG. 19, with the two latches in extended positions.

Preferably, the actuator AC is movable between an unlocked position and a locked position. In such cases, the (or each) latch 150 is configured: (i) to move from the retracted position to the extended position in response to movement of the actuator from an unlocked position to a locked position, and (ii) to move from the extended position to the retracted position in response to movement of the actuator from the locked position to the unlocked position. In embodiments where the module base 1 includes two latches 150, both of the two latches 150 preferably are configured to move (e.g., simultaneously) between the retracted position and the extended position in response to movement (e.g., simultaneous movement) of the actuator between the unlocked position and the locked position. With reference to FIGS. 11 and 13, the unlocked position of the illustrated actuator AC (and thus also the unlocked position of each latch 150) is shown in FIG. 11, whereas the locked position (of both the actuator and each lever) is shown in FIG. 13. With reference to FIGS. 19 and 21, the unlocked position of the illustrated actuator AC (and thus also the unlocked position of each latch 150) is shown in FIG. 19, whereas the locked position (of both the actuator and each lever) is shown in FIG. 21.

The actuator AC can optionally be a tool-free actuator and/or a single-motion actuator, which is configured to move between the unlocked position and the locked position in response to a single motion operation. The illustrated actuator AC moves from the unlocked position to the locked position in response to a single motion of the actuator, and also moves from the locked position to the unlocked position in response to a single motion of the actuator. As can be appreciated by referring to FIGS. 11 and 13 and FIGS. 19 and 21, the illustrated single-motion actuator is a tool-free actuator, which is configured to move between the unlocked position and the locked position in response to a tool-free, single motion operation. Moreover, the illustrated actuator can be actuated (i.e., moved between the unlocked position and the locked position) by an operator using a single hand (optionally by moving the actuator linearly or pivotally). It is therefore particularly easy to operate. Thus, there preferably is only a single actuator AC that is configured to simultaneously actuate all (e.g., both) of the latches 150.

If desired, the actuator can alternatively be configured for multiple motion operation. For example, an actuator comprising a lever may be moved from left to right (e.g., from the unlocked position to the locked position), and then moved down into a detent/retention groove/slot, which can retain the lever in that position until an operator later lifts it up and moves it back to the left (e.g., to the unlocked position). Different variants of this nature will be apparent to skilled artisans given the present teaching as a guide.

Preferably, the actuator AC comprises a lever LE configured to move linearly or pivotally when the actuator moves between the unlocked position and the locked position. In the embodiment of FIGS. 11 and 13, the actuator AC comprises a lever LE configured to move pivotally (about a pivot axis normal to a top wall 55 of the module base 1 and/or normal to an adjacent aircraft floor FLR) when the actuator moves between the unlocked position and the locked position. Similarly, in the embodiment of FIGS. 19 and 21, the actuator AC comprises a lever LE configured to move pivotally (e.g., about a pivot axis parallel to a top wall 55 of the module base 1 and/or parallel to an adjacent aircraft floor FLR) when the actuator moves between the unlocked position and the locked position. In some cases, the actuator comprises the lever and a handle, which may be located at a proximal end of the lever. If desired, the handle can be provided in the form of a ball or knob assembled onto the proximal end of the lever. In other cases, the proximal end of the lever itself defines the handle.

In some cases, the lever LE is configured to move parallel (or at least substantially parallel) to a top wall 55 of the module base 1 and/or to an adjacent aircraft floor FLR when the actuator AC moves between the unlocked position and the locked position. Reference is made to the embodiment of FIGS. 11 and 13. In other cases, the actuator comprises a lever configured to move in a generally up and down manner (rather than side-to-side) when the actuator AC moves between the unlocked position and the locked position. Reference is made to the embodiment of FIGS. 19 and 21. Here, the lever LE is configured to move (e.g., upwardly) closer to the top wall 55 of the module base 1 when the actuator AC moves from the unlocked position to the locked position, and the lever LE is configured to move (e.g., downwardly) further from the top wall 55 of the module base 1 when the actuator AC moves from the locked position to the unlocked position. More generally, various types of actuators can be used for latch extension and retraction, including various electronic actuators that initiate operating a motor to move the (or each) latch between retracted and extended positions. Preferably, though, the actuator AC is configured for manual operation and is devoid of any motor or electronics.

In some cases, the actuator AC comprises a lever LE that is received in a track. Reference is made to the embodiment of FIGS. 11 and 13, and the embodiment of FIGS. 19 and 21.

The track can extend longitudinally along the module base (as shown in FIGS. 11 and 13) or it can extend in an upright direction along the module base (as shown in FIGS. 19 and 21). When provided, the track can include an elongated slot in which the lever is received (and along which the lever is configured to move when an operator adjusts the lever between its locked and unlocked positions). This is shown in FIGS. 11 and 13 (which show the lever received in a longitudinal slot), and in FIGS. 19 and 21 (which show the lever received in an upright slot).

In FIGS. 11 and 13 and in FIGS. 19 and 21, the actuator AC is on (e.g., projects from) the front F side of the module base 1. While this is preferred, it is not required. Instead, the actuator may be on the rear side of the module base. Another option is to provide the actuator on either the head-side end or the feet-side end of the module base. For a given application, the preferred location may depend upon the working space that will be available around the different sides of the module base.

In the embodiments shown in FIGS. 11 and 13 and FIGS. 19 and 21, the actuator AC is located closer to the top side T of the module base 1 than to the bottom side B. Here, the illustrated actuator AC is adjacent the top side T of the module base 1. This can be advantageous, for example, in embodiments where the actuator AC is a mechanical actuator (e.g., a manually-operable mechanical actuator). In some cases, the illustrated actuator AC is located on the front side F of the module base 1 above an instrument panel. As illustrated, the instrument panel may include one or more of supply outlets for oxygen, air, and vacuum. In addition, the instrument panel may include various other conventional buttons, gauges, and/or other outlets, controls, and displays. The details described in this paragraph, however, are optional.

Figure 12:
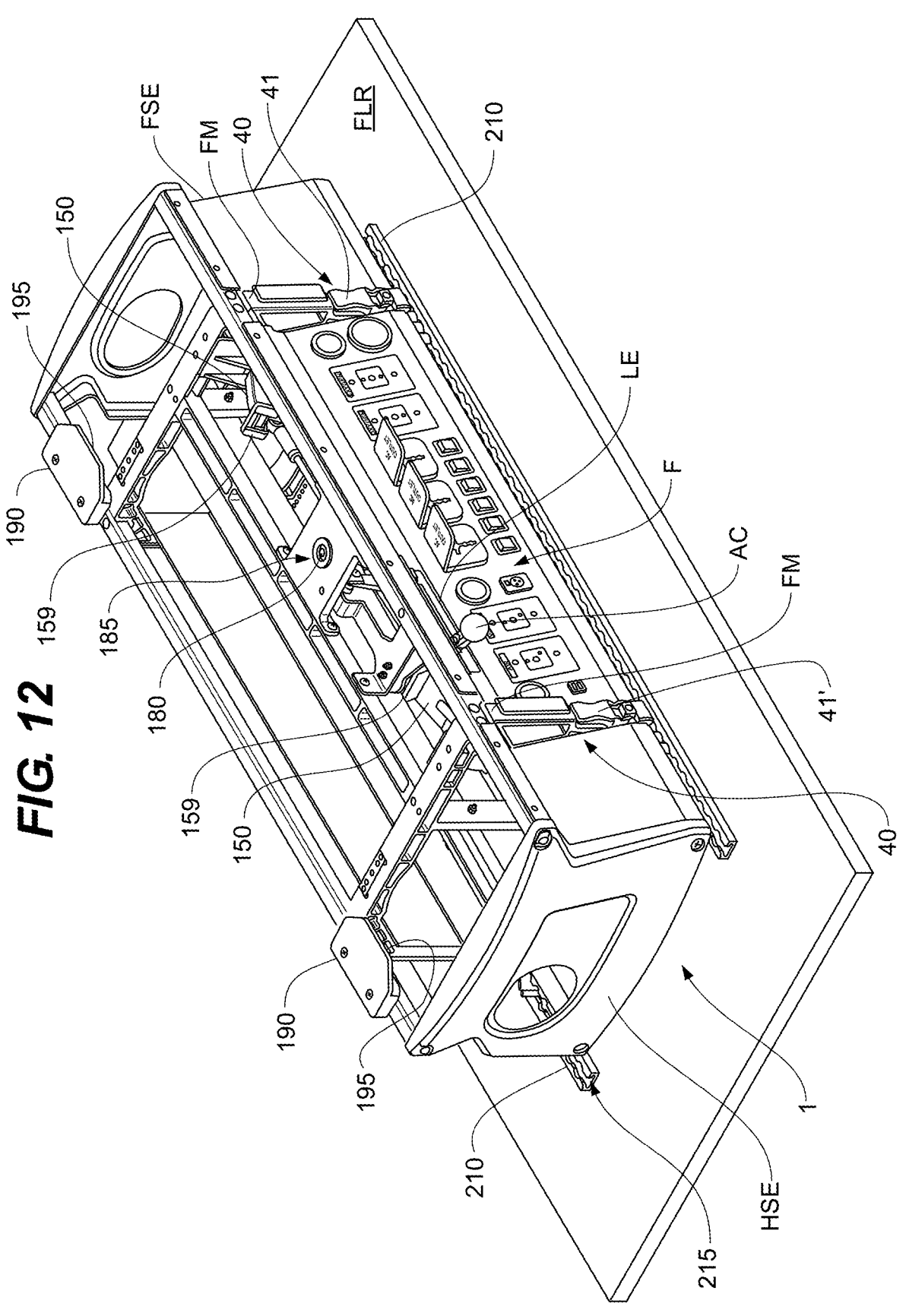
FIG. 12 is a perspective view of the module base of FIG. 11 with a top wall of the module base omitted for illustration purposes, and the two latches in retracted positions.
Figure 14:
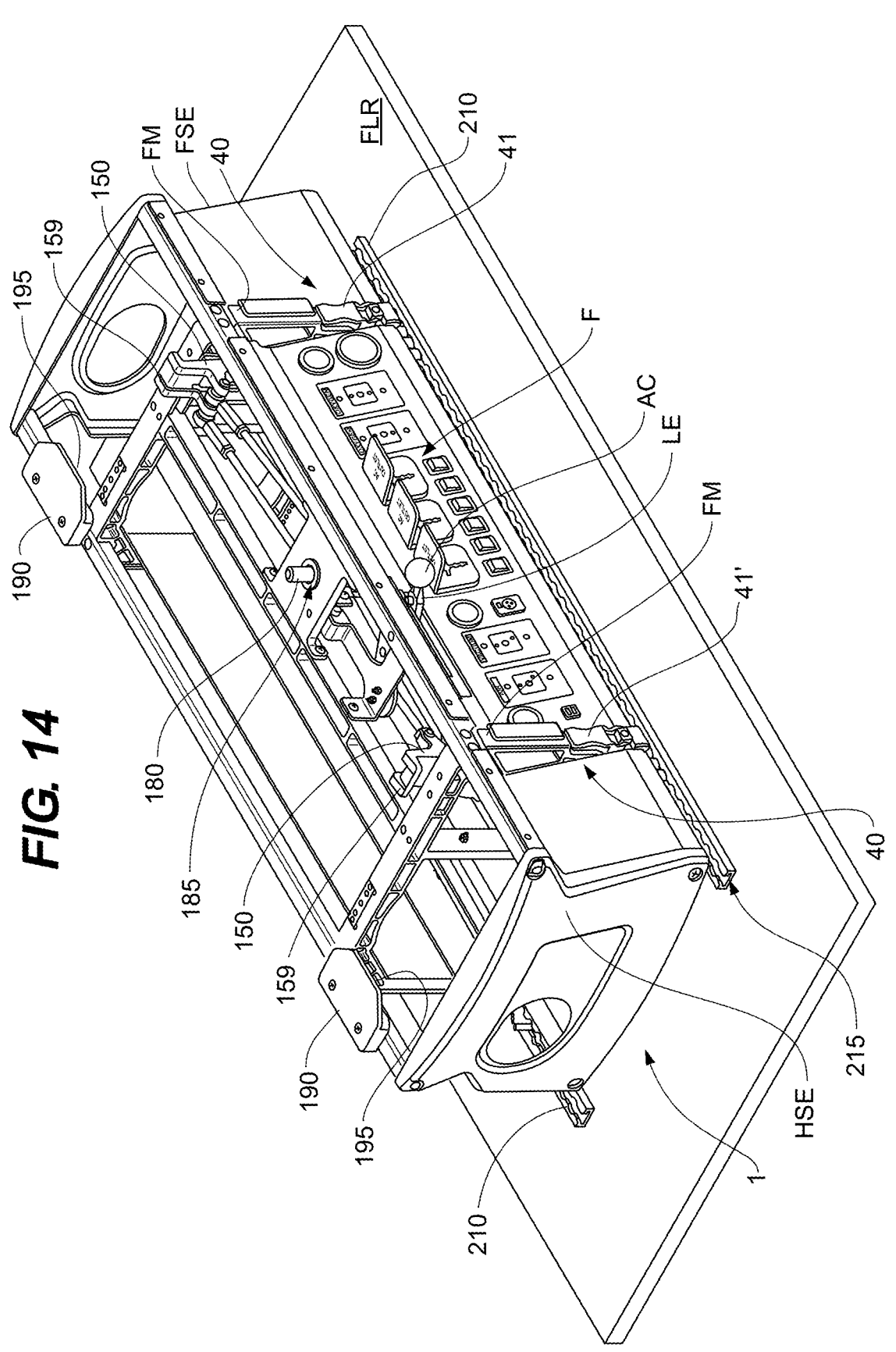
FIG. 14 is a perspective view of the module base of FIG. 11 with a top wall of the module base omitted for illustration purposes, and the two latches in extended positions.
Figure 15C:
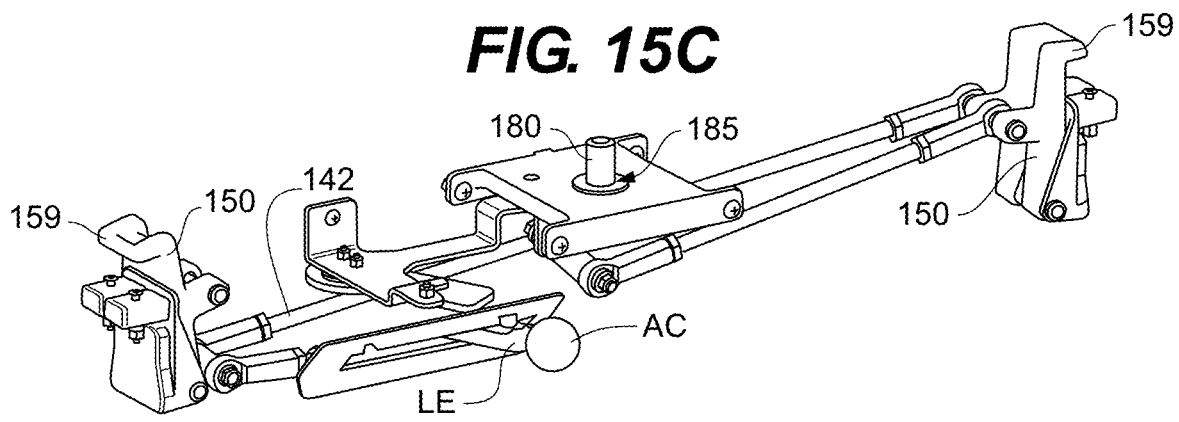
FIGS. 15A-C are perspective detail views of an exemplary actuator-lock assembly that is useful in a module base of the invention.
Figure 15B:
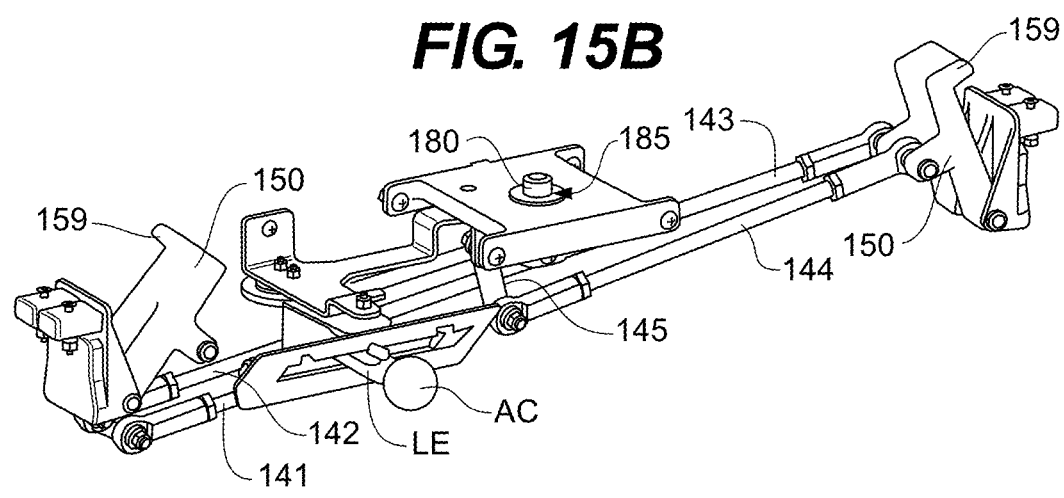
Figure 15A:
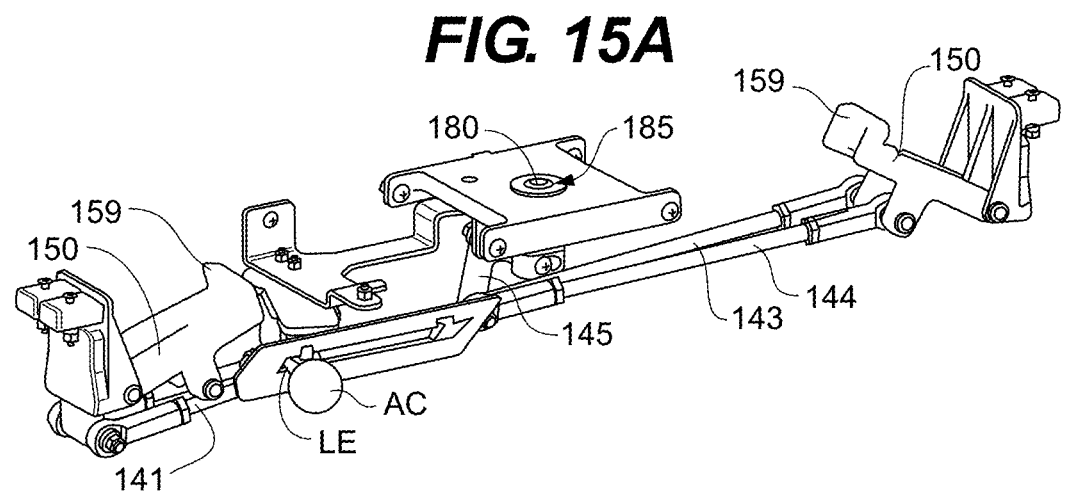

FIGS. 15A-15C show an exemplary actuator assembly that can be used. FIG. 15A shows the configuration of the assembly when the actuator AC is in the unlocked position. FIG. 15B shows the configuration of the assembly when the actuator AC is in transition between the unlocked position and the locked position. FIG. 15C shows the configuration of the assembly when the actuator AC is in the locked position. Moreover, FIGS. 12 and 14 show the module base 1 with the top wall 55 omitted for illustration purposes. These figures show how the actuator assembly can be incorporated into the module base. It is to be appreciated, however, that the illustrated actuator assembly is merely one suitable example; various different actuator assemblies can be used.

With continued reference to FIGS. 15A-15C, the illustrated actuator assembly comprises an actuator AC, two latches 150, a mount pin 180, and a series of links 141-145. If desired, the mount pin 180 can be omitted, such that the latches 150 will bear additional load, which the mount pin otherwise bears. As illustrated, the links 141-145 have a plurality of connections at rotatable joints that enable movement of the actuator assembly between unlocked and locked configurations. Preferably, the actuator assembly is mounted to two frame members FM. As is perhaps best shown in FIGS. 12 and 14, the illustrated actuator assembly is mounted to both frame members FM and to two longitudinal beams that extend between the frame members. It is to be appreciated, however, that these details are by no means limiting. Various other mounting arrangements can be used.

While the illustrated actuator assembly comprises two latches, there can alternatively be only a single latch. As one example, the mount pin can be omitted and a single latch can be provided in the location where the mount pin is shown.

In such cases, the single latch can optionally be a curved hook that projects upwardly and rearwardly when in an extended position. A single latch of this nature may be positioned generally midway along the length of the module base. In other cases, the actuator assembly may comprise three or more (e.g., four) latches.

Preferably, each latch 150 has a retracted position and an extended position, the module base 1 has a top side T, and each latch when in the extended position projects upwardly from the top side of the module base. Thus, for embodiments where the module base 1 includes two latches 150, each of the two latches preferably has a retracted position and an extended position, and each of the two latches when in the extended position projects upwardly from the top side of the module base. Reference is made to the embodiment shown in FIGS. 12 and 14, as well as the embodiment shown in FIGS. 19 and 21.

The latch(es) 150 are positioned to releasably engage the bottom side BT of the stretcher 10. As two examples, reference is made to the embodiment of FIG. 10 and the embodiment of FIG. 24. Preferably, the latch(es) 150 are positioned to releasably engage one or more bars and/or plates 18, 18' on the bottom side BT of the stretcher 10.

The top side T of the module base 1 preferably comprises a top wall 55 configured to supportably receive a bottom side BT of the stretcher 10. In more detail, the top side T of the module base 1 preferably has an opening 155 in the top wall 55 through which a latch 150 extends when in the extended position. For embodiments where the module base 1 includes two latches 150, the top side T of the module base 1 preferably includes two openings 155 in the top wall 55 through which the two latches 150 extend respectively when in the extended position. This can be appreciated by referring to the non-limiting example of FIG. 13. This can also be appreciated by referring to the non-limiting example of FIG. 19.

In the illustrated embodiments, the top wall 55 of the module base 1 comprises (e.g., is) a generally planar wall. This can optionally be the case for any embodiment of the present disclosure. If desired, the top wall may be concave, e.g., so as to be configured to receive a stretcher in a nested manner.

With continued reference to FIGS. 11 and 13, the illustrated module base 1 has a length and a width, the length is greater than the width, and the two illustrated latches 150 are centered on a common axis CA extending along the length of the module base. This type of arrangement is also shown in FIGS. 19 and 21. This, however, is by no means required. There can alternatively be two or more latches positioned at different locations along the width of the module base. As just one example, there can alternatively be two latches centered on an axis extending along a width of the module base. Moreover, the module base may have only a single latch in some cases.

In FIGS. 11 and 13, the module base 1 has a front side F and a rear side R, and the common axis CA is located closer to the front side than to the rear side. This type of arrangement is also shown in FIGS. 19 and 21. Alternatively, the common axis, when provided, can be centered on the midpoint of the width of the module base, or it can be located closer to the rear side than to the front side.

While FIGS. 11 and 13, as well as FIGS. 19 and 21, show the module base 1 having only two latches 150, there can alternatively be three or more. For example, the module base can have four latches, two on a first axis that is adjacent the head-side end of the module base and extends across a width of the module base, while two other latches are on a second axis that is adjacent the feet-side end of the module base and extends across a width of the module base. Given the present teaching as a guide, many suitable variants will be apparent to skilled artisans.

Preferably, the module base 1 has opposed head-side HSE and feet-side FSE ends, and two latches 150 are respectively spaced inwardly of the head-side and feet-side ends. In FIGS. 11 and 13, each of the two illustrated latches 150 is spaced inwardly from the adjacent end (which is either the head-side HSE or feet-side FSE end) of the module base 1 by at least 10% (or at least 15%, or even at least 20%) of the length of the module base and/or a top wall 55 thereof. This is also shown in FIGS. 19 and 21. In addition, each latch 150 preferably is spaced inwardly from both the front F and rear R sides of the module base 1. The illustrated latches 150 are closer to the front side F of the module base 1 than to the rear side R. As noted above, however, this is not required.

In some embodiments, the module base 1 includes two latches 150 that are configured to pivot away from each other when they move from the retracted position to the extended position. This can be appreciated by comparing FIGS. 11 and 13, and by referring to FIGS. 15A-15C. Each of the latches 150 shown in those figures is configured to pivot about an axis (e.g., an axis extending along the width of the module base) that is parallel to a top wall 55 of the module base 1 and/or parallel to an adjacent floor FLR. In FIGS. 11 and 13, the two illustrated latches 150, when moving from the retracted position to the extended position, pivot respectively toward the head-side end HSE and the feet-side end FSE of the module base 1. As noted above, however, this is not required. For example, two latches can alternatively be positioned/oriented to pivot toward and away from the front and rear sides of the module base. Moreover, two latches located on a common axis of the nature described above can alternatively be configured to pivot toward each other when they move from the retracted position to the extended position. Furthermore, two latches (optionally located on a common axis) can alternatively be configured to pivot upwardly and rearwardly (i.e., generally toward the rear side R of the module base) when they move from the retracted position to the extended position. Reference is made to FIGS. 19 and 21, which are described in more detail below.

The present embodiment group includes some embodiments wherein the module base 1 is in a mounted position within an aircraft having a seat track 200. Reference is made to FIGS. 10-14, as well as FIGS. 19-22 and 24. Here, the module base 1 is attached removably to two spaced-apart rails 210 of the seat track 200, whereby the module base is adjacent to a floor FLR of the aircraft.

Figures 16A, 16B:
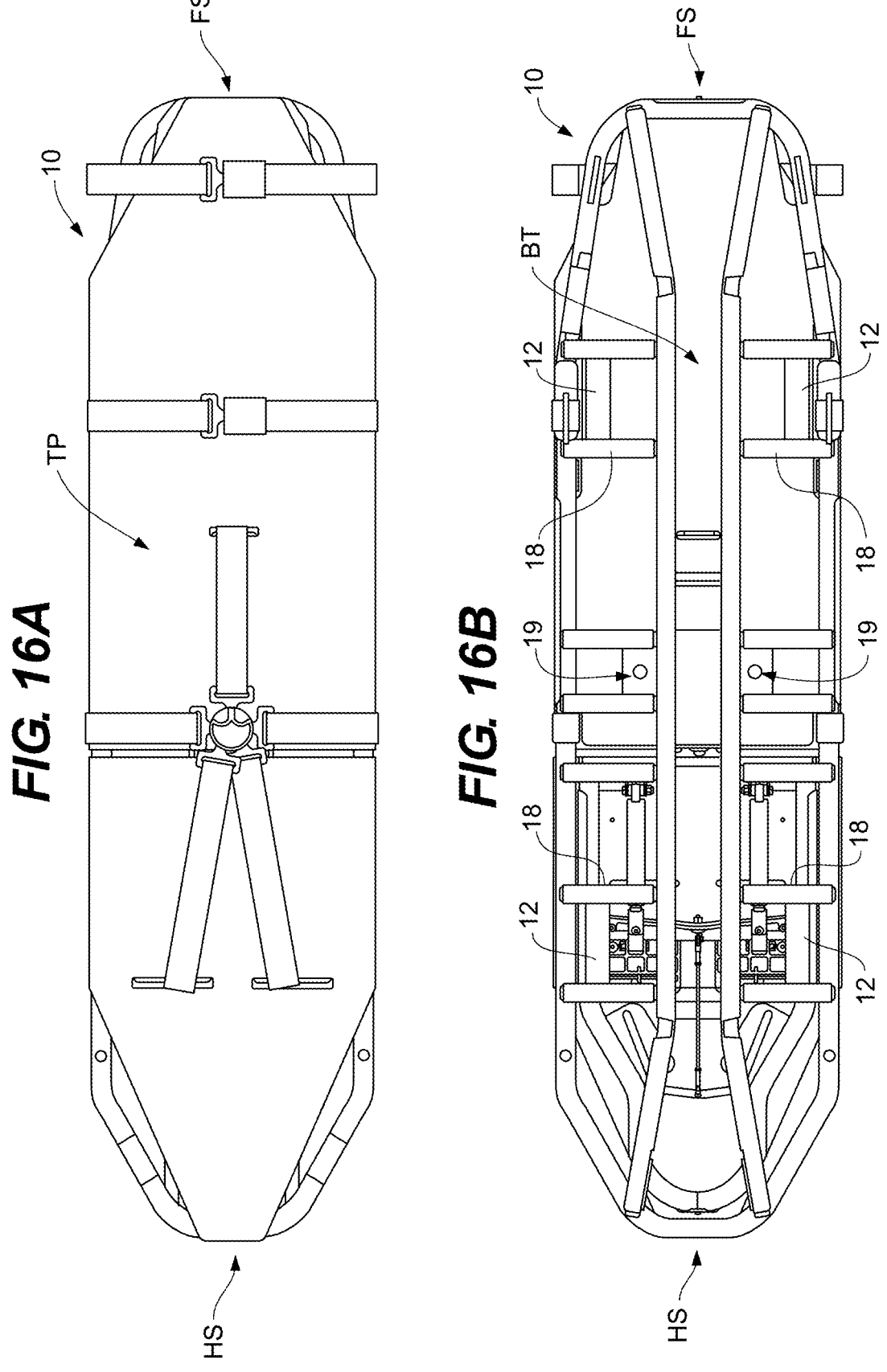
FIGS. 16A and 16B are top and bottom views of the stretcher in FIG. 10.
Figure 18:
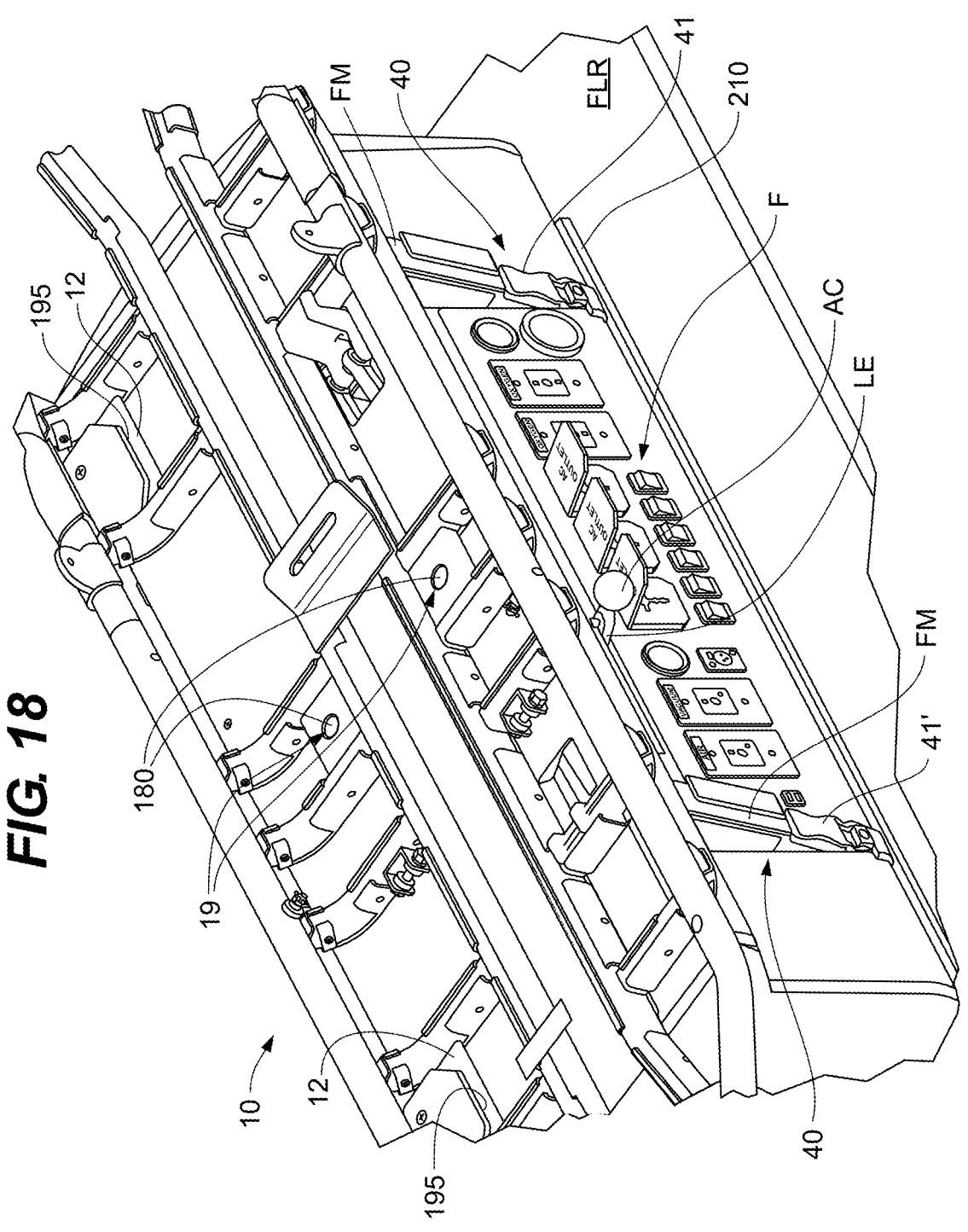
FIG. 18 is a perspective, broken-away, close-up view of the aeromedical ambulance module of FIG. 10 with portions of the stretcher omitted for illustration purposes.
Figure 24:
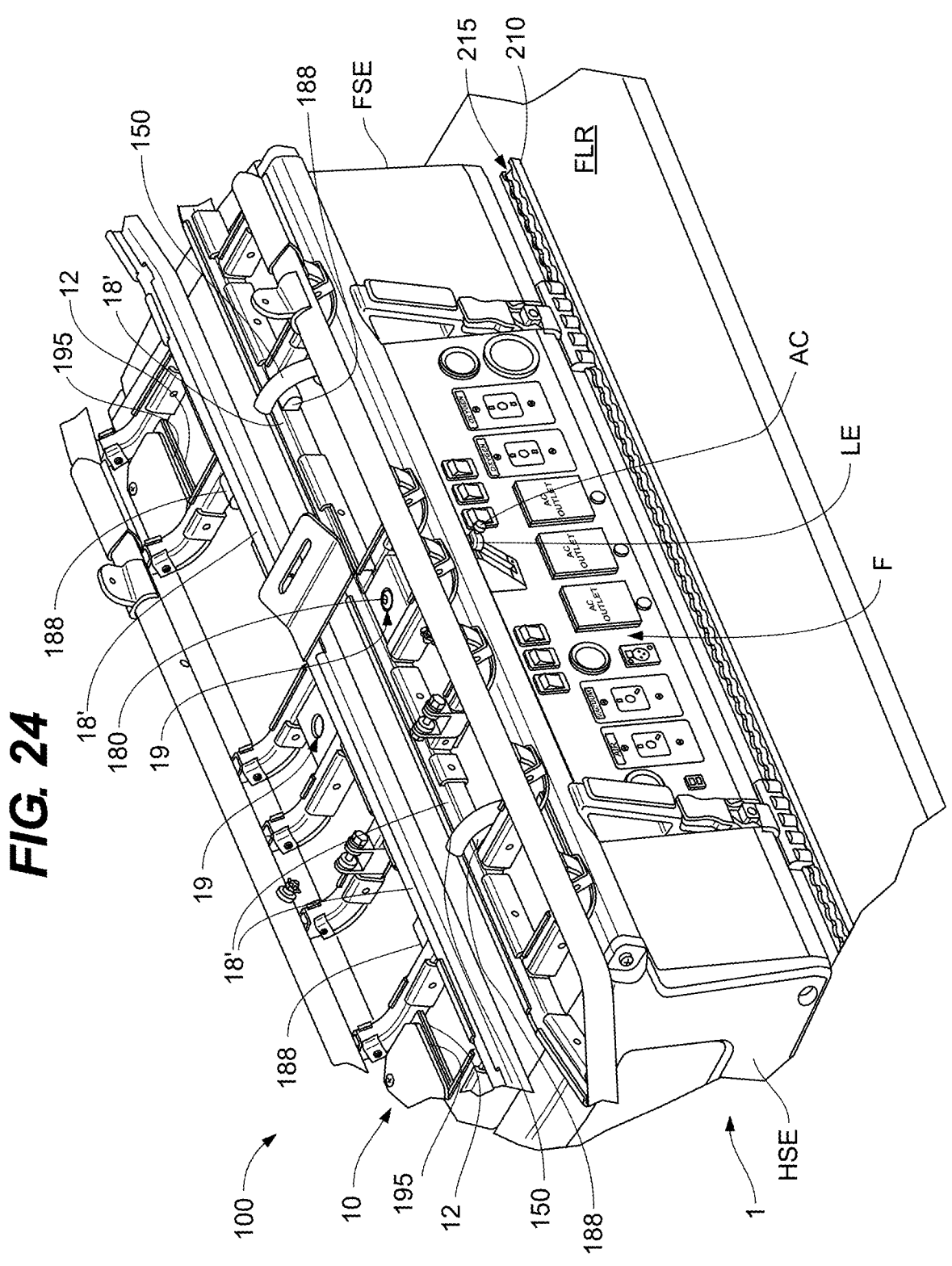
FIG. 24 is a perspective, broken-away, close-up view of an aeromedical ambulance module that includes the module base of FIG. 19 and a stretcher in accordance with certain embodiments of the invention; portions of the stretcher are omitted for illustration purposes.

The present embodiment group also includes certain embodiments wherein the aeromedical ambulance module 100 further includes the stretcher 10. Reference is made to FIGS. 10, 18, and 24. The stretcher 10 has a top side TP and a bottom side BT. One suitable stretcher 10 is illustrated in FIGS. 16A and 16B; FIG. 16A shows the top side TP; FIG. 16B shows the bottom side BT. Another suitable stretcher 10 is shown in FIG. 24. It is to be appreciated, however, that the stretcher can be provided in various other configurations.

In the illustrated embodiment of FIG. 10 wherein the stretcher 10 is releasably locked onto the module base 1, the stretcher 10 (e.g., a bottom side BT thereof) has two bars 18 to which the two latches 150 respectively are engaged releasably. This can be appreciated by also referring to FIGS. 16B, 17, and 18. Similarly, in the illustrated embodiment of FIG. 24, the stretcher 10 is releasably locked onto the module base 1, such that the stretcher (e.g., a bottom side thereof) has two bars 18' to which the two latches 150 respectively are engaged releasably. In the embodiment of FIG. 24, each of the two bars 18' extends along a length of the stretcher 10. In the embodiment of FIG. 10, each of the two bars 18 extends along a width of the stretcher 10. In FIG. 24, each of the two bars 18' can optionally be equipped with a bearing shoulder 188. When provided, the bearing shoulders 188 can be configured to facilitate stable locking engagement of the latches 150 onto the stretcher 10. Preferably, when the stretcher 10 is releasably locked onto the module base 1, the stretcher is retained in a locked (e.g., stationary) position relative to the module base 1.

The module base 1 preferably includes a mount pin 180 having a retracted position and an extended position. In such cases, the mount pin 180 when in the extended position projects upwardly from a top side T of the module base 1. Moreover, the illustrated mount pin 180 when in the retracted position is retracted inside (e.g., entirely inside) the module base. However, this is not required. In some embodiments, the mount pin 180 and the (or each) latch 150 are configured to move simultaneously: (i) from the retracted position to the extended position in response to movement of the actuator AC from the unlocked position to the locked position, and (ii) from the extended position to the retracted position in response to movement of the actuator AC from the locked position to the unlocked position.

The illustrated mount pin 180 is configured to project through an aperture 185 in the top wall 55 of the module base 1. Reference is made to FIG. 11. Reference is also made to FIG. 19. Preferably, the mount pin 180 has a circular cross-sectional shape, and the aperture 185 also is circular. In such cases, diameter of the aperture preferably substantially matches (e.g., is not more than 10 percent greater than) the diameter of the mount pin, such that there is not a large gap around the mount pin into which fluids may flow. It is to be appreciated that the mount pin can alternatively have a square or other polygonal cross-sectional shape.

In FIGS. 11 and 13, the optional mount pin 180 is located between (e.g., directly between) the two latches 150. When provided, the mount pin 180 preferably is located closer to the front side F of the module base 1 than to the rear side R. This, however, is not required. As just one example, the mount pin can alternatively be located on the top wall halfway between the front and rear sides of the module base. In FIGS. 11 and 13, the illustrated latches 150 and the mount pin 180 are all located on the common axis CA. This, however, is by no means required. Instead, the mount pin can be provided at various different locations on the top side of the module base.

In certain embodiments involving the mount pin 180 and two latches 150, the aeromedical ambulance module 100 further includes the stretcher 10. The stretcher 10 has a top side TP and a bottom side BT. In such embodiments, when the actuator AC is in the locked position, the bottom side BT of the stretcher 10 preferably includes two bars 18 or 18' to which the two latches 150 respectively are engaged releasably. In addition, the bottom side BT of the stretcher 10 preferably has an aperture 19 in which the mount pin 180 is received. The mount pin 180 can thus serve advantageously as a shear pin, e.g., so as to reduce shear load on the latch(es) 180 when the stretcher 10 is operably mounted on the module base 1.

If desired, the module base can include a plurality of mount pins. For example, there can alternatively be two or more extendable/retractable mount pins on the module base. Furthermore, in addition to, or instead of, having one or more retractable mount pins, the module base may include one or more non-retractable mount pins. Preferably, though, the (or each) mount pin 180 on the module base 1 is retractable. This may advantageously reduce the likelihood of the stretcher catching on a mount pin and thus creating interference when placing the stretcher onto the module base. It may also advantageously facilitate removing the stretcher easily from the module base.

While a mount pin 180 is shown in FIGS. 10-14, and also in FIGS. 19-22 and 24, it can alternatively be omitted. In such cases, the latch(es) may have an especially heavy duty construction and/or be coupled with a shoulder or wall that separately engages the stretcher to reduce shear on the latches. Thus, in some embodiments, the module base includes one or more (e.g., two) latches, but the mount pin is omitted.

Preferably, the module base 1 and the stretcher 10 are configured to allow the stretcher to be operably mounted (e.g., releasably locked) on the module base with the head side HS of the stretcher adjacent either the head-side end HSE or the feet-side end FSE of the module base. Thus, the invention also provides embodiments wherein the stretcher 10 has mount bars 18 or 18' (and optionally mount regions 12 and/or a mount aperture 19) on each lateral half of the stretcher. This is perhaps best appreciated by referring to FIGS. 16B and 17 or FIG. 24. Some embodiments of the invention provide the stretcher 10 itself (e.g., on its own/not in combination with the module base 1). Other embodiments of the invention provide an aeromedical ambulance module 100 with both the module base 1 and the stretcher 10, such that the module 100 has two operatively-mounted configurations: one with the head side HS of the stretcher adjacent the head-side end HSE of the module base, the other with the feet-side end FSE of the stretcher adjacent the head-side end HSE of the module base.

Preferably, the module base 1 further comprises an indexing arrangement 1900. When provided, the indexing arrangement 1900 is configured to facilitate guiding the stretcher 10 to a predetermined mount position (see FIG. 10) on the module base 1. When the stretcher is in the mount position on the module base, the actuator can be operated so as to move the (or each) latch from the retracted position to the extended position, such that the latch(es) lock the stretcher on the module base. The stretcher 10 is then in an operably mounted position on the module base 1.

The optional indexing arrangement 1900 can comprise one or more shoulders 190 that project upwardly from the top side T (e.g., from top wall 55) of the module base 1. In FIGS. 11 and 13, the indexing arrangement 1900 comprises two shoulders 190 spaced apart along the length of the module base 1. This is also the case in FIGS. 19 and 21. The two illustrated shoulders 190 are on the top side T of the module base 1, adjacent the rear side R of the module base. One of the two shoulders 190 is adjacent the head-side end HSE of the module base 1, while the other shoulder 190 is adjacent the feet-side end FSE. Preferably, the two latches 190 are located between the two shoulders 190 (not directly between, but as measured along the length of the module base). Alternatively, the two shoulders may be aligned with the two latches, or the two shoulders may be located between the two latches. Moreover, in cases where there is only a single latch, it may be located between the two shoulders (as measured along the length of the module base), e.g., midway between the two shoulders. Given the present teaching as a guide, various alternatives of this nature will be apparent to the person of ordinary skill in the art.

The illustrated shoulders 190 are configured to respectively receive (e.g., seat) two mount portions 12 on a bottom side BT of the stretcher 10. When provided, each shoulder 190 preferably includes a flange 195 that engages a respective one of the mount portions 12 on the bottom side BT of the stretcher 10 when the stretcher is operably mounted on the module base 1. This is perhaps best appreciated by referring to FIG. 18 or FIG. 24. In such embodiments, a mount space is bounded collectively by the shoulder 190 and the top wall 55 of the mount base 1. In more detail, each illustrated mount space is located between the flange 195 of a shoulder 190 and the top wall 55 of the mount base 1.

Various other shoulder configurations can be used. For example, each shoulder can alternatively be a single bar, hook, or block that projects upwardly from the top wall of the module base. Such a bar or hook can extend upwardly and forwardly (i.e., generally toward a front side F of the module base).

Figure 17:
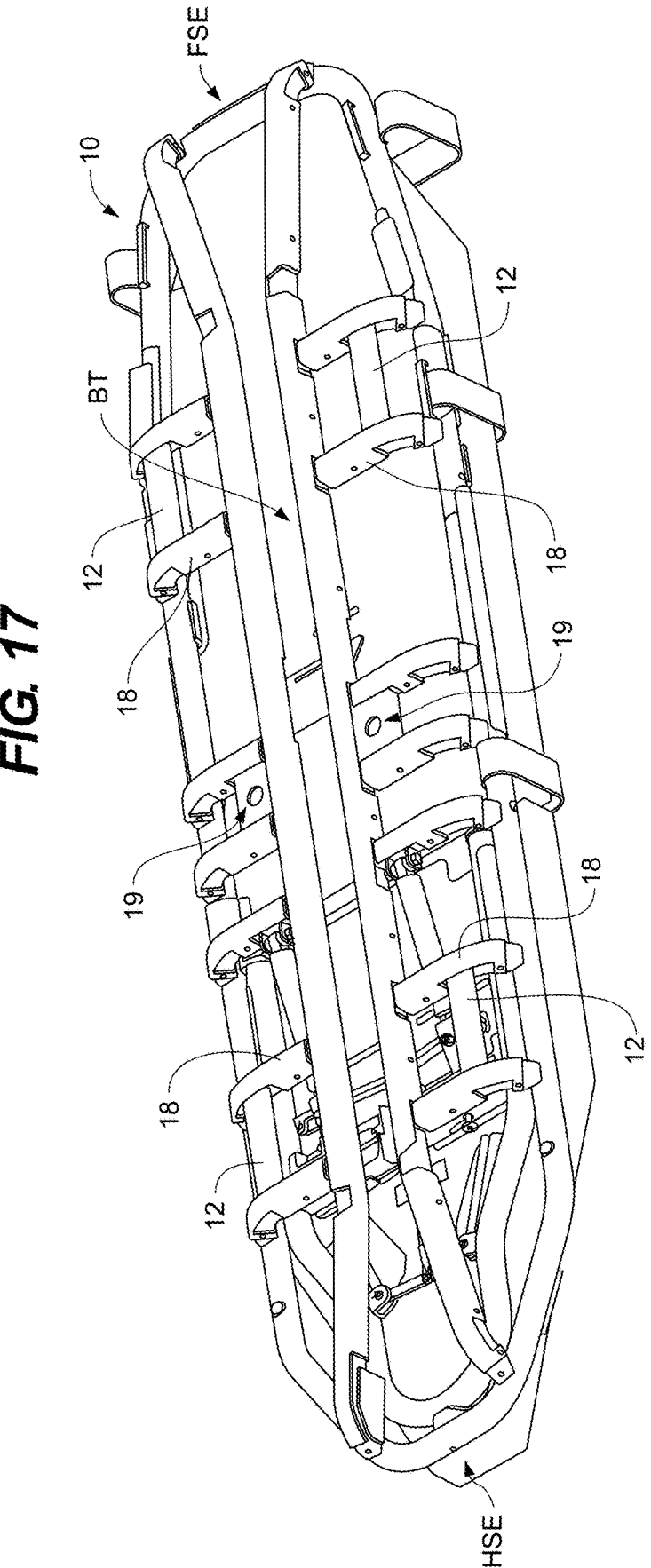
FIG. 17 is a perspective bottom view of the stretcher in FIG. 10.

Preferably, the stretcher 10 includes mount portions 12 comprising bars, which can optionally be elongated parallel to (or substantially parallel to) the length of the stretcher 10. Reference is made to FIG. 17. Here, the illustrated mount portions 12 are elongated parallel to (or substantially parallel to) the length of the stretcher 10, while the illustrated mount bars 18 are elongated perpendicular to (or substantially perpendicular to) the length of the stretcher. In FIG. 24, the illustrated mount portions 12 are elongated parallel to (or substantially parallel to) the length of the stretcher 10, and the illustrated mount bars 18' are also elongated parallel to (or substantially parallel to) the length of the stretcher. In FIG. 17, each mount portion 12 is connected to one of the mount bars 18. This, however, is not required. For example, see FIG. 24.

In the illustrated stretcher embodiment, each longitudinal half of the stretcher 10 includes two mount bars 18 or 18', two mount portions 12, and a mount aperture 19. In other embodiments, the mount apertures are omitted. Additionally or alternatively, the mount portions 12 may be omitted (e.g., in cases where the shoulders 190 are omitted). In such cases, there may be no mount aperture, no mount pin, and no shoulders, but there preferably are at least two latches 150, such as three or more latches, with the latches optionally doing all the locking and unlocking of the stretcher onto the module base. As another alternative, there can be only a single mount bar on each longitudinal half of the stretcher.

In some preferred embodiments, the module base 1 has a front side F and a rear side R, two latches 150 are closer to the front side than to the rear side, and two shoulders 190 are closer to the rear side than to the front side. The embodiment of FIGS. 11 and 13 is one non-limiting example. The embodiment of FIGS. 19 and 21 is another non-limiting example. Rather than having two shoulders, an alternative is to have just a single shoulder located about midway along the length of the module base, in combination with two latches. In such cases, the single shoulder can optionally be elongated so as to embrace more of the stretcher. Another alternative is to have just a single latch located about midway along the length of the module base, in combination with two shoulders. Given the present teaching as a guide, various other suitable alternatives will be apparent to the person of ordinary skill in this field.

In embodiments where the module base 1 has an indexing arrangement 1900 comprising two shoulders 190, the locations of the shoulders can be varied. In FIGS. 11 and 13, the two latches 150 are located between the two shoulders 190. Alternatively, two shoulders can be located between two latches. Another possibility is to provide just a single shoulder, e.g., located at a midpoint of the length of the module base (preferably on the top side of the module base, adjacent the rear side of the module base).

Figure 20:
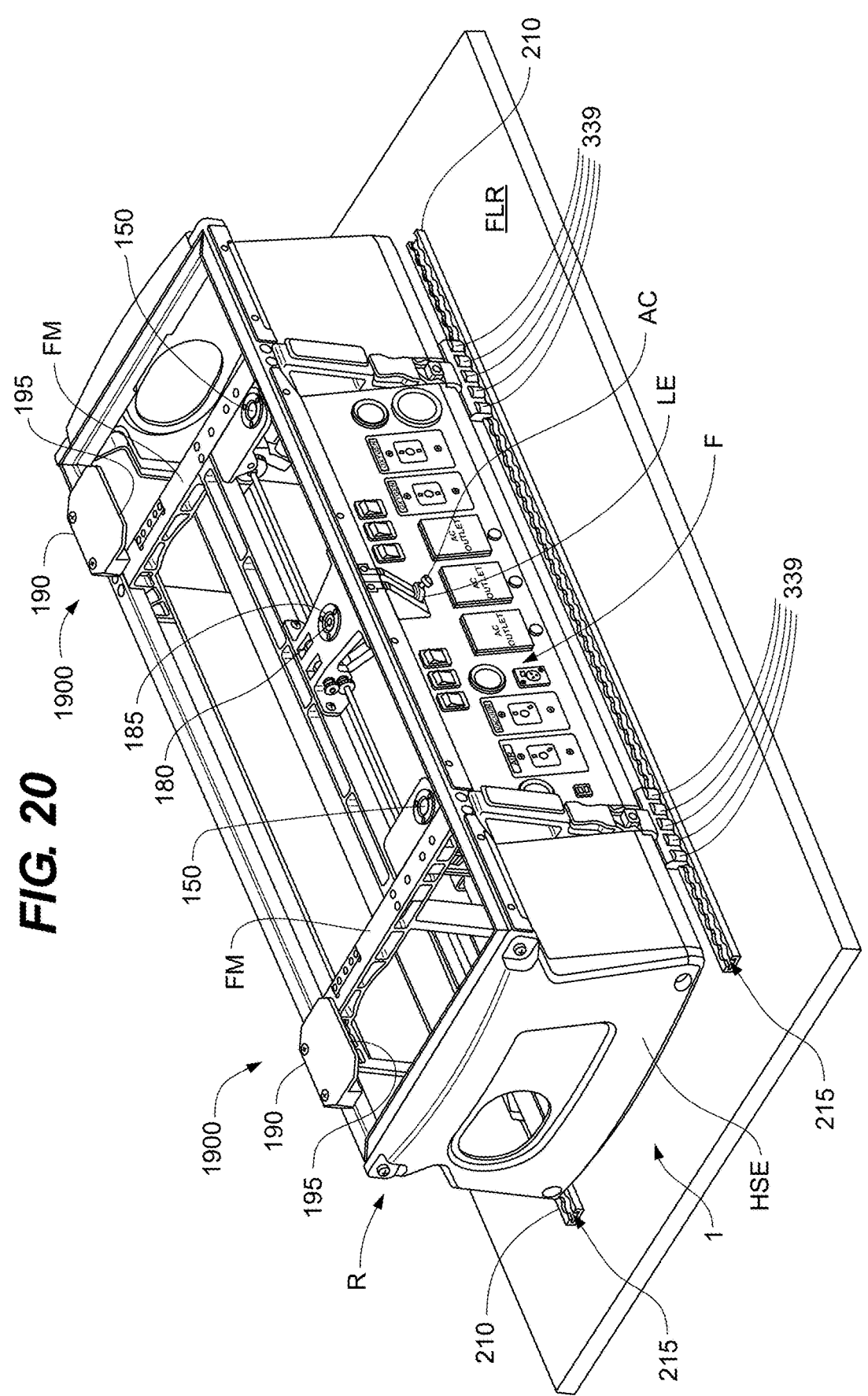
FIG. 20 is a perspective view of the module base of FIG. 19 with a top wall of the module base omitted for illustration purposes, and the two latches in retracted positions.
Figure 22:
FIG. 22 is a perspective view of the module base of FIG. 19 with a top wall of the module base omitted for illustration purposes, and the two latches in extended positions.
Figure 23C:
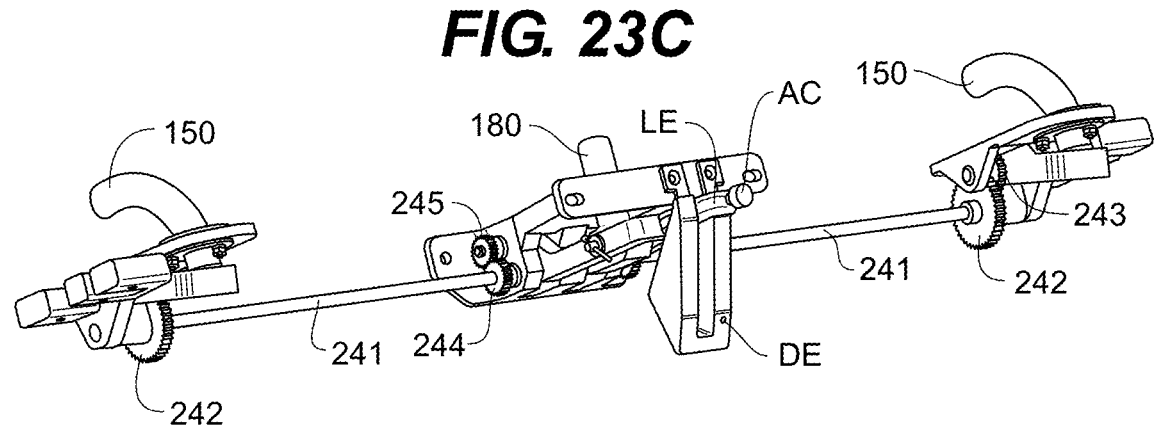
FIGS. 23A-C are perspective detail views of an exemplary actuator-lock assembly that is useful in a module base of the invention.
Figure 23B:
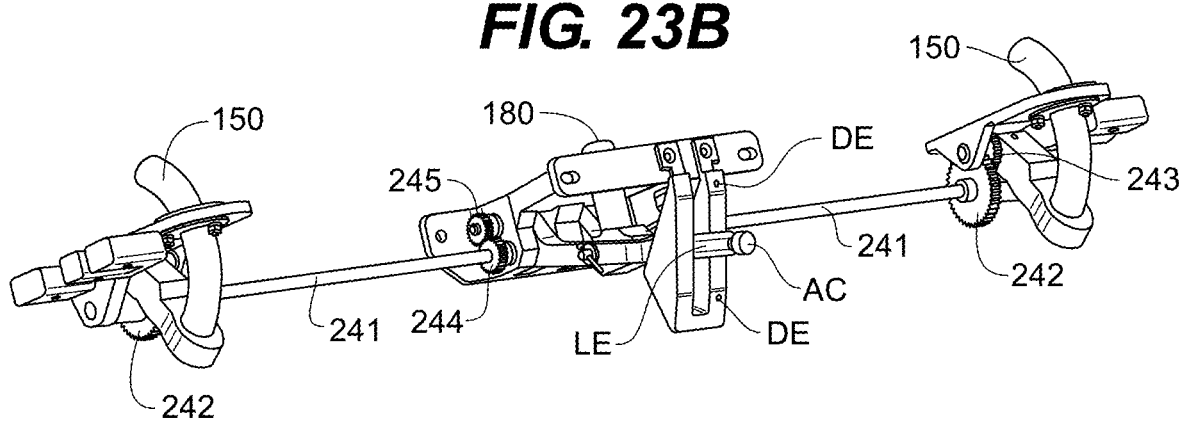
Figure 23A:
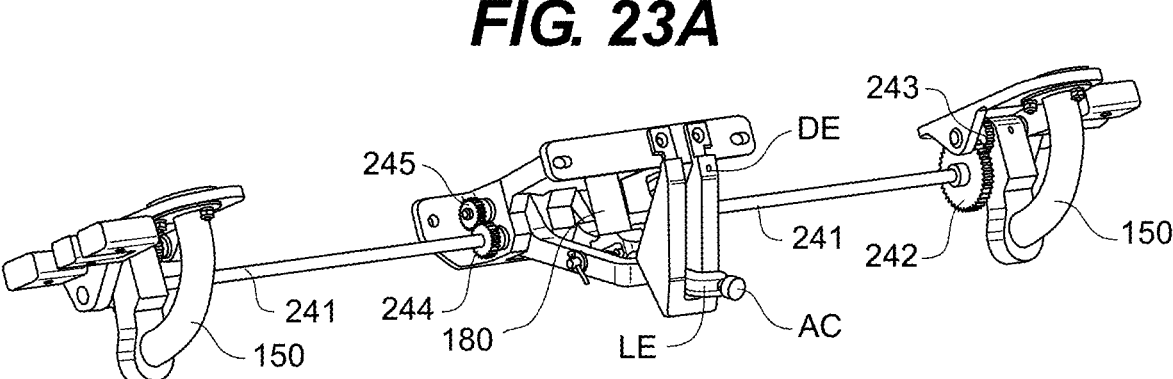

FIGS. 23A-23C show another embodiment wherein an advantageous actuator assembly is provided. FIG. 23A shows the configuration of the actuator assembly when the actuator AC is in the unlocked position. FIG. 23B shows the configuration of the actuator assembly when the actuator AC is in transition between the unlocked position and the locked position. FIG. 23C shows the configuration of the actuator assembly when the actuator AC is in the locked position. Moreover, FIGS. 20 and 22 show the module base 1 with the top wall 55 omitted for illustration purposes. These figures show how the actuator assembly can be incorporated into the module base. It is to be appreciated, however, that the illustrated actuator assembly is merely one suitable example; various different actuator assemblies can be used.

With continued reference to FIGS. 23A-23C, the illustrated actuator assembly comprises an actuator AC, two latches 150, a mount pin 180, one or more axles 241, and a series of gears 242-245. If desired, the mount pin 180 can be omitted, such that the latches 150 will bear additional load, which the mount pin otherwise bears. As illustrated, two axles 241 are coupled with a series of gears 242-245 that enable movement of the actuator assembly between unlocked and locked configurations. Preferably, the actuator assembly is mounted to two frame members FM. As is perhaps best shown in FIGS. 20 and 22, the illustrated actuator assembly is mounted to both frame members FM and to two longitudinal beams that extend between the frame members. It is to be appreciated, however, that these details are by no means limiting. Various other mounting arrangements can be used.

In FIGS. 19-23C, the two illustrated latches 150 are each configured to pivot upwardly and rearwardly (i.e., generally toward the rear side R of the module base) when they move from the unlocked position to the locked position. These particular latches 150 are shown in the form of curved hooks, each comprising a curved bar. In more detail, each of these illustrated latches 150 is a hook comprising a curved bar having a circular cross-sectional shape, and it is configured to project through a circular opening (e.g., aperture) 155 in the top wall 55 of the module base 1. It is to be appreciated, however, that the latch(es) 150 can be provided in various different forms.

Thus, in certain embodiments, there are two latches 150 each comprising a bar having a cross section of a selected geometrical shape, the top wall 55 of the module base 1 has two openings (e.g., apertures) 155 each having a desired geometrical shape, which corresponds to the selected geometrical shape, and each bar projects through a corresponding one of the two openings when the two latches 150 are in the extended position. For example, each of the two latches 150 can comprise a bar having a circular cross section, the top wall 55 of the module base 1 can have two openings 155 each with a circular shape, and each bar can project through a corresponding one of the two openings 155 when the two latches 150 are in the extended position. The embodiment of FIGS. 19-23C is one example. In such cases, a diameter of each opening 155 preferably substantially matches (e.g., is not more than 10 percent greater than) the diameter of the bar, such that there is not a large gap around the bar into which fluids may flow. It is to be appreciated that the bar can alternatively have a polygonal (e.g., rectangular) or oval cross-sectional shape.

As can be appreciated from FIGS. 19-23C, the top wall 55 of the module base 1 can optionally be devoid of exposed openings (through which fluids may pass into an interior of the module base) other than: (i) a gap between the top wall 55 of the module base 1 and each latch 150, and (ii) a gap between the top wall 55 of the module base 1 and the optional mount pin 180, when provided. Arrangements of this nature can advantageously prevent or minimize the intrusion of fluids and the like into the module base 1.

In some embodiments, the actuator AC includes a detent. When provided, the detent preferably is configured to: (i) releasably hold the actuator in place when the actuator is in the locked position, and (ii) releasably hold the actuator in place when the actuator is in the unlocked position. As is perhaps best shown in FIGS. 23A-23C, the detent can comprise a fastener (e.g., a pin), which can be advanced into a first detent opening DE so as to releasably hold the actuator in the locked position. Thus, the detent can optionally comprise a pin that is moveable axially between engaged and disengaged positions. Preferably, the pin or other fastener can also be advanced into a second detent opening DE so as to releasably hold the actuator in the unlocked position. In other cases, the second detent opening is omitted, such that the detent is only used to releasably hold the actuator in place when the actuator is in the unlocked position. If desired, the detent can be resiliently biased toward an advanced position. Additionally or alternatively, the detent can optionally comprise a threaded pin or other threaded fastener, and the (or each) detent opening DE can be interiorly threaded.

Following are non-limiting examples of utility for certain embodiments of the module base:

The aeromedical ambulance module base can be attached to an existing aircraft seat track without modifying the floor. The feet of the module are placed in an outboard seat track, matching an indexing of the foot with scallops of the track. An inboard side of the module is then lowered into the track with the feet indexing the track as well. Two over-center levers are then engaged, driving the inboard feet fully into the track, and wedging the outboard feet into their corresponding seat track as well. To remove the module base, the over-center levers are disengaged/retracted, withdrawing the feet from the seat track. The module base can then be lifted from the track.

Following are non-limiting examples of construction for certain embodiments of the module base:

The aeromedical ambulance module base can be composed of machined and formed aluminum sheet, plate, and bar. Rather than aluminum, other aircraft metals (e.g., titanium or tungsten) can optionally be used for one or more components. The internal components can be affixed to each other by means of common mechanical fasteners.

Following are non-limiting examples of utility for certain embodiments of the stretcher to module base attachment:

The aeromedical ambulance module base can secure the aeromedical ambulance stretcher via stationary indexing plates, retractable hooks, and a pin. The stretcher can be placed on the top of the ambulance module base while matching-up a set of indexing plates to the underside of the stretcher. The user can operate an actuator (e.g., a lever) located on a face of the ambulance module base. This lever or other actuator can be operated to extend a pair of latches (e.g., hooks) that when extended capture (e.g., lockingly embrace) an underside of the stretcher, and simultaneously a pin extends from the ambulance module base and is thereby inserted into a corresponding hole in the stretcher. To later remove the stretcher from module base, the actuator (e.g., lever) can be operated in a reverse direction, thereby retracting the latches (e.g., hooks) and the pin back into the ambulance module base and thus freeing the stretcher from the module base.

Following are non-limiting examples for construction of the stretcher and module base attachment components:

The ambulance stretcher can be a welded structure constructed of aluminum tubing, plate, and bar. The attachment components of the module base can be constructed of formed aluminum bar. Rather than aluminum, other aircraft metals (e.g., titanium or tungsten) can optionally be used for one or more components. The internal components can be affixed to the module base by means of common mechanical fasteners.

While some preferred embodiments of the invention have been described, it should be understood that various changes, adaptations and modifications may be made therein without departing from the spirit of the invention and the scope of the appended claims.

What is claimed is:

1. An aeromedical ambulance module configured to be mounted in an aircraft, the aeromedical ambulance module comprising a module base that has a front side, a rear side, a top side, a bottom side, a feet-side end, and a head-side end, the module base having a length and a width, the length of the module base extending from the feet-side end to the head-side end, and the width of the module base extending from the front side to the rear side, wherein the length of the module base is greater than the width of the module base, and the module base includes two latches configured to releasably secure a stretcher onto the module base, each of the two latches having a retracted position and an extended position, the module base further comprising an actuator operably coupled with the two latches, the actuator being movable between an unlocked position and a locked position, such that each of the two latches is configured to move from the retracted position to the extended position in response to movement of the actuator from the unlocked position to the locked position, the module base further including an indexing arrangement that comprises two shoulders configured to respectively receive two mount portions on a bottom side of the stretcher, wherein the two shoulders are located adjacent the rear side of the module base, whereas the two latches are located closer to the front side of the module base than to the rear side.

2. The aeromedical ambulance module of claim 1 wherein the actuator is a single-motion actuator that is configured to move between the unlocked position and the locked position in response to a tool-free operation.

3. The aeromedical ambulance module of claim 1 wherein the actuator comprises a lever configured to move pivotally when the actuator moves between the unlocked position and the locked position.

4. The aeromedical ambulance module of claim 1 wherein the module base has a top side, and each of the two latches when in the extended position projects upwardly from the top side of the module base.

5. The aeromedical ambulance module of claim 4 wherein the top side of the module base comprises a generally planar top wall configured to supportably receive a bottom side of the stretcher, the top side of the module base having two openings in the generally planar top wall through which the two latches extend respectively when in the extended position.

6. The aeromedical ambulance module of claim 1 wherein the two latches being are centered on a common axis extending along the length of the module base.

7. The aeromedical ambulance module of claim 1 wherein the two latches when in the retracted position are inside the module base.

8. The aeromedical ambulance module of claim 1 wherein the two latches are respectively spaced inwardly of the head-side and feet-side ends of the module base by at least 10% of the length of the module base.

9. The aeromedical ambulance module of claim 8 wherein the two latches are respectively spaced inwardly of the head-side and feet-side ends of the module base by at least 15% of the length of the module base.

10. The aeromedical ambulance module of claim 1 wherein the module base is in a mounted position within an aircraft having a seat track, such that the module base is attached removably to two spaced-apart rails of the seat track, whereby the module base is adjacent to a floor of the aircraft.

11. The aeromedical ambulance module of claim 1 wherein the two latches are configured to pivot away from each other when they each move from the retracted position to the extended position.

12. The aeromedical ambulance module of claim 1 wherein the aeromedical ambulance module further includes the stretcher, the stretcher has a top side and a bottom side, and the bottom side of the stretcher has two bars to which the two latches respectively are engaged releasably, the two bars extending along a length of the stretcher, the stretcher having a head side and a feet side, the head side and the feet side being on opposite ends of the stretcher, such that the length of the stretcher extends from the head side to the feet side.

13. The aeromedical ambulance module of claim 12 wherein the module base and the stretcher are configured to allow the stretcher to be releasably locked on the module base with the head side of the stretcher adjacent either the head-side end or the feet-side end of the module base, such that aeromedical ambulance module has two operatively-mounted configurations: one with the head side of the stretcher adjacent the head-side end of the module base, the other with the feet side of the stretcher adjacent the head-side end of the module base.

14. The aeromedical ambulance module of claim 13 wherein the stretcher has mount bars on each lateral half of the stretcher.

15. The aeromedical ambulance module of claim 1 wherein the two latches are each configured to pivot upwardly and rearwardly, so as to move toward the rear side of the module base, when they each move from the unlocked position to the locked position.

16. The aeromedical ambulance module of claim 15 wherein the actuator comprises a lever received in an upright track extending in an upright direction along the front side of the module base.

17. The aeromedical ambulance module of claim 16 wherein each of the two latches comprises a curved bar.

18. The aeromedical ambulance module of claim 16 wherein each of the two latches comprises a bar having a circular cross section, the top side of the module base has two openings each with a circular shape, and each bar projects through a corresponding one of the two openings when the two latches are each in the extended position.

19. The aeromedical ambulance module of claim 1 wherein the actuator includes a detent, the detent configured to releasably hold the actuator in place when the actuator is in the locked position.

20. The aeromedical ambulance module of claim 19 wherein the detent comprises a pin that is moveable axially between engaged and disengaged positions.

21. The aeromedical ambulance module of claim 1 wherein the two latches are configured to releasably secure the stretcher onto the module base by releasably engaging two mount bars on the bottom side of the stretcher that are elongated parallel to, or substantially parallel to, a length of the stretcher.

22. The aeromedical ambulance module of claim 21 wherein the two shoulders are configured to respectively receive the two mount portions on the bottom side of the stretcher, where the two mount portions on the bottom side of the stretcher are elongated parallel to, or substantially parallel to, the length of the stretcher.

23. The aeromedical ambulance module of claim 1 wherein the module base comprises a housing of aluminum, titanium, or tungsten.

24. The aeromedical ambulance module of claim 1 wherein the module base is composed of machined and formed sheets, plates, and bars of aluminum, titanium, or tungsten.

25. The aeromedical ambulance module of claim 1 wherein the front side of the module base includes an instrument panel, and the actuator is on the front side of the module base.

26. The aeromedical ambulance module of claim 25 wherein the instrument panel on the front side of the module base includes one or more of supply outlets for oxygen, air, and vacuum.

27. The aeromedical ambulance module of claim 25 wherein the actuator on the front side of the module base is adjacent the top side of the module base.

28. The aeromedical ambulance module of claim 1 wherein one of the two shoulders is adjacent the head-side end of the module base, whereas the other of the two shoulders is adjacent the feet-side end of the module base.

29. An aeromedical ambulance module configured to be mounted in an aircraft, the aeromedical ambulance module comprising a module base that has a front side, a rear side, a top side, a bottom side, a feet-side end, and a head-side end, the module base having a length and a width, with the length of the module base extending from the feet-side end to the head-side end, and the width of the module base extending from the front side to the rear side, wherein the length of the module base is greater than the width of the module base, and the module base includes two latches configured to releasably secure a stretcher onto the module base, each of the two latches having a retracted position and an extended position, and wherein the two latches are located closer to the front side of the module base than to the rear side, the module base further comprising an actuator operably coupled with the two latches, the actuator being movable between an unlocked position and a locked position, such that each of the two latches is configured to move from the retracted position to the extended position in response to movement of the actuator from the unlocked position to the locked position, wherein the module base further comprises a mount pin having a retracted position and an extended position, the mount pin when in the extended position projecting upwardly from the top side of the module base, such that the mount pin when in the extended position is configured to be received in an aperture in a bottom side of the stretcher, and the mount pin when in the retracted position is retracted inside the mount base.

30. The aeromedical ambulance module of claim 29 wherein the mount pin and each of the two latches are configured to move from the retracted position to the extended position in response to movement of the actuator from the unlocked position to the locked position.

31. The aeromedical ambulance module of claim 30 wherein the aeromedical ambulance module further includes the stretcher, the stretcher has a top side and the bottom side, the actuator is in the locked position, the bottom side of the stretcher has two bars to which the two latches respectively are engaged releasably, and the mount pin is received in the aperture in the bottom side of the stretcher.

32. The aeromedical ambulance module of claim 14 wherein the two bars on the bottom side of the stretcher to which the two latches respectively are engaged releasably are elongated parallel to, or substantially parallel to, a length of the stretcher, the stretcher having a head side and a feet side, the head side and the feet side being on opposite ends of the stretcher, such that the length of the stretcher extends from the head side to the feet side.

33. The aeromedical ambulance module of claim 29 wherein the module base further comprises two seating shoulders configured to respectively receive two mount portions on a bottom side of the stretcher, and the two seating shoulders are closer to the rear side of the module base than to the front side.

34. The aeromedical ambulance module of claim 12 wherein the mount pin is closer to the front side of the module base than to the rear side.

35. The aeromedical ambulance module of claim 29 wherein module base includes a top wall that is devoid of exposed openings other than: (i) a gap between the top wall and each latch, and (ii) a gap between the top wall and the mount pin.

36. The aeromedical ambulance module of claim 29 wherein the top side of the module base comprises a generally planar top wall having an aperture from which the mount pin projects when in the extended position, and the mount pin when in the retracted position is retracted entirely inside the mount base.

\* \* \* \* \*